United States Patent
Masuno et al.

(10) Patent No.: US 9,575,548 B2
(45) Date of Patent: Feb. 21, 2017

(54) APPARATUS FOR MIGRATING VIRTUAL MACHINES TO ANOTHER PHYSICAL SERVER, AND METHOD THEREOF

(71) Applicant: FUJITSU LIMITED, Kawasaki-shi, Kanagawa (JP)

(72) Inventors: Michio Masuno, Yokohama (JP); Navid Afzalshooshtary, Ashiya (JP); Yuko Matsushita, Himeji (JP); Kenji Takahashi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/105,579

(22) Filed: Dec. 13, 2013

(65) Prior Publication Data

US 2014/0189689 A1 Jul. 3, 2014

(30) Foreign Application Priority Data

Dec. 28, 2012 (JP) ................................. 2012-287748

(51) Int. Cl.
- *G06F 9/46* (2006.01)
- *G06F 1/32* (2006.01)
- *G06F 9/50* (2006.01)

(52) U.S. Cl.
CPC ............ *G06F 1/3287* (2013.01); *G06F 1/329* (2013.01); *G06F 9/5088* (2013.01); *Y02B 60/1282* (2013.01); *Y02B 60/144* (2013.01); *Y02B 60/162* (2013.01)

(58) Field of Classification Search
None
See application file for complete search history.

(56) References Cited

U.S. PATENT DOCUMENTS

| 8,185,894 B1 * | 5/2012 | Watson .................. G06F 9/485 718/1 |
| 2005/0131982 A1 | 6/2005 | Yamasaki et al. |
| 2009/0172168 A1 | 7/2009 | Sonoda et al. |
| 2009/0228589 A1 * | 9/2009 | Korupolu ............ H04L 67/1097 709/226 |
| 2011/0134761 A1 * | 6/2011 | Smith ................ H04L 43/0852 370/252 |

FOREIGN PATENT DOCUMENTS

| JP | 2005-174201 | 6/2005 |
| JP | 2009-116380 | 5/2009 |
| JP | 2011-90704 | 5/2011 |
| WO | 2008-041302 | 4/2008 |

* cited by examiner

*Primary Examiner* — Wissam Rashid
(74) *Attorney, Agent, or Firm* — Fujitsu Patent Center

(57) ABSTRACT

An apparatus obtains response information including a result of processing executed by a virtual machine operates on the first device, calculates the first value that is used to evaluate a response time from transmission of the request information to reception of the response information, calculates a ratio of processing capability of the first device to processing capability of the second device, calculates, based on the first value and the ratio, a second value that is used to evaluate a processing time until a response for a request is received when the virtual machine operates on the second device, determines the second device to be a migration destination candidate of the virtual machine when the second value is smaller than a threshold value, migrates the virtual machine that operates on the first device to the migration destination candidate to turn off the power of the first device.

15 Claims, 29 Drawing Sheets

| MIGRATION TARGET SERVICE NAME | MIGRATION TARGET TIME ZONE | MIGRATION SOURCE PHYSICAL SERVER NAME | VIRTUAL SERVER NAME | MIGRATION DESTINATION PHYSICAL SERVER NAME | OPERATIONAL CONSUMPTION POWER (W) BEFORE MIGRATION | OPERATIONAL CONSUMPTION POWER (W) AFTER MIGRATION | REDUCTION POWER (W) (OPERATIONAL CONSUMPTION POWER BEFORE MIGRATION- OPERATIONAL CONSUMPTION POWER AFTER MIGRATION) |
|---|---|---|---|---|---|---|---|
| SERVICE A | 06:00:00 ~ 18:00:00 | SV1 | VM1 | SV6 | 2000 | 1600 | 400 |
| SERVICE A | 12:00:00 ~ 14:00:00 | SV2 | VM2 | SV7 | 1500 | 1000 | 500 |
| SERVICE B | 00:00:00 ~ 23:59:59 | SV3 | VM1 | SV8 | 1500 | 1200 | 300 |
| | | | | | | TOTAL | 1200 |

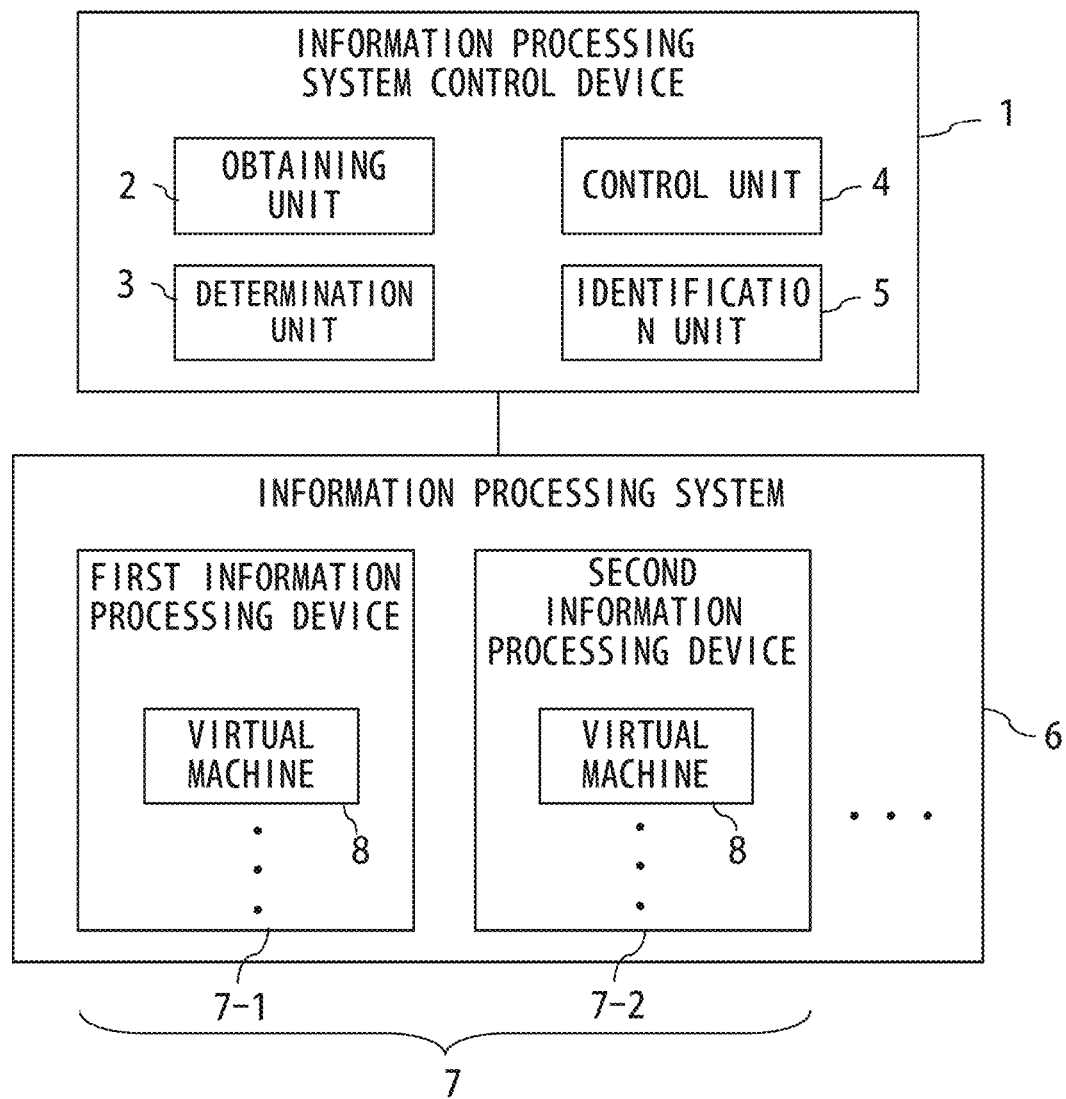
F I G. 1

| PHYSICAL SERVER NAME | NUMBER OF CLOCKS | CPU USAGE RATE | MEMORY USAGE RATE | BUSY RATE OF DISK | ... |
|---|---|---|---|---|---|
| NS11 | ○○ MHZ | 20% | 60% | 40% | ... |
| NS12 | ×× MHZ | 50% | 30% | 10% | ... |
| ... | ... | ... | ... | ... | ... |

FIG. 3

| PHYSICAL SERVER NAME | VIRTUAL SERVER NAME |
|---|---|
| NS11 | Web-1、Web-2、APL-1 |
| NS12 | APL-2、DB-1、Web-3 |
| ... | ... |

| SERVICE NAME | VIRTUAL SERVER NAME | AVERAGE ONLINE RESPONSE TIME |
|---|---|---|
| SERVICE A | Web-1、APL-1、DB-1 | XXXX |
| SERVICE B | Web-2、APL-2、DB-2 | XXXX |

50

F I G. 5

| COLLECTION ITEM LEVEL | ONLINE RESPONSE TIME (PROPORTION OF ONLINE RESPONSE TIME TO SLA) |
|---|---|
| 1 | 0%~20% |
| 2 | 20%~40% |
| 3 | 40%~60% |
| 4 | 60%~80% |
| 5 | 80%~100% |

FIG. 6

| No. | OBTAINED INFORMATION |
|---|---|
| A01 | TIME AT WHICH REQUEST IS INPUT TO FRONT SERVER |
| A02 | TIME AT WHICH REQUEST IS OUTPUT FROM FRONT SERVER (TO BACK-END SERVER) |
| A03 | TIME AT WHICH REQUEST IS INPUT TO BACK-END SERVER |
| A04 | TIME AT WHICH REQUEST IS OUTPUT FROM BACK-END SERVER (TO DB SERVER) |
| A05 | TIME AT WHICH REQUEST IS INPUT TO DB SERVER |
| A06 | TIME AT WHICH RESPONSE IS OUTPUT FROM DB SERVER (TO BACK-END SERVER) |
| A07 | TIME AT WHICH RESPONSE COMES INTO BACK-END SERVER |
| A08 | TIME AT WHICH RESPONSE IS OUTPUT FROM BACK-END SERVER (TO FRONT SERVER) |
| A09 | TIME AT WHICH RESPONSE IS INPUT TO FRONT SERVER (FROM BACK-END SERVER) |
| A10 | TIME AT WHICH RESPONSE IS OUTPUT FROM FRONT SERVER |
| A11 | CPU (Central Processing Unit) USAGE RATE OF FRONT SERVER |
| A12 | MEMORY USAGE AMOUNT OF FRONT SERVER |
| A13 | I/O BUSY RATE OF DISK OF FRONT SERVER |
| A14 | CPU USAGE RATE OF BACK-END SERVER |
| A15 | MEMORY USAGE AMOUNT OF BACK-END SERVER |
| A16 | I/O BUSY RATE OF DISK OF BACK-END SERVER |
| A17 | CPU USAGE RATE OF DB SERVER |
| A18 | MEMORY USAGE AMOUNT OF DB SERVER |
| A19 | I/O BUSY RATE OF DISK OF DB SERVER |

F I G. 7

| TIME | SERVICE | SAFETY LEVEL | APPEARANCE RATE (%) |
|---|---|---|---|
| 0:00~0:59 | ... | ... | ... |
| ... | ... | ... | ... |
| 14:00~14:59 | SERVICE A | 1 | 20 |
| 14:00~14:59 | SERVICE B | 2 | 13 |
| 14:00~14:59 | SERVICE C | 3 | 0 |
| 14:00~14:59 | SERVICE D | 4 | 53 |
| 14:00~14:59 | SERVICE E | 5 | 13 |
| ... | | ... | ... |

60, 70

ONE RECORD GROUP (ONE SET)

F I G. 10

| SERVICE NAME | TIME ZONE CANDIDATE |
|---|---|
| . . . | . . . |
| SERVICE A | 14:00~15:00 |
| | . . . |

F I G. 1 1

/ 70

| TIME | SERVICE | SAFETY LEVEL | APPEARANCE RATE (%) |
|---|---|---|---|
| 0:00~0:59 | ... | ... | ... |
| ... | ... | ... | ... |
| 14:00~14:59 | SERVICE A | 1 | 20 |
| 14:00~14:59 | SERVICE B | 2 | 13 |
| 14:00~14:59 | SERVICE C | 3 | 0 |
| 14:00~14:59 | SERVICE D | 4 | 53 |
| 14:00~14:59 | SERVICE E | 5 | 13 |
| 15:00~15:59 | SERVICE A | 1 | 20 |
| 15:00~15:59 | SERVICE B | 2 | 13 |
| 15:00~15:59 | SERVICE C | 3 | 0 |
| 15:00~15:59 | SERVICE D | 4 | 53 |
| 15:00~15:59 | SERVICE E | 5 | 13 |
| ... | ... | ... | ... |
| XX:XX~XX:XX | XXXX | X | XX |
| XX:XX~XX:XX | XXXX | X | XX |
| XX:XX~XX:XX | XXXX | X | XX |
| XX:XX~XX:XX | XXXX | X | XX |
| XX:XX~XX:XX | XXXX | X | XX |
| ... | ... | ... | ... |

RECORD GROUP [j]

RECORD GROUP [j+1]

RECORD GROUP [j+Y]

F I G. 1 3

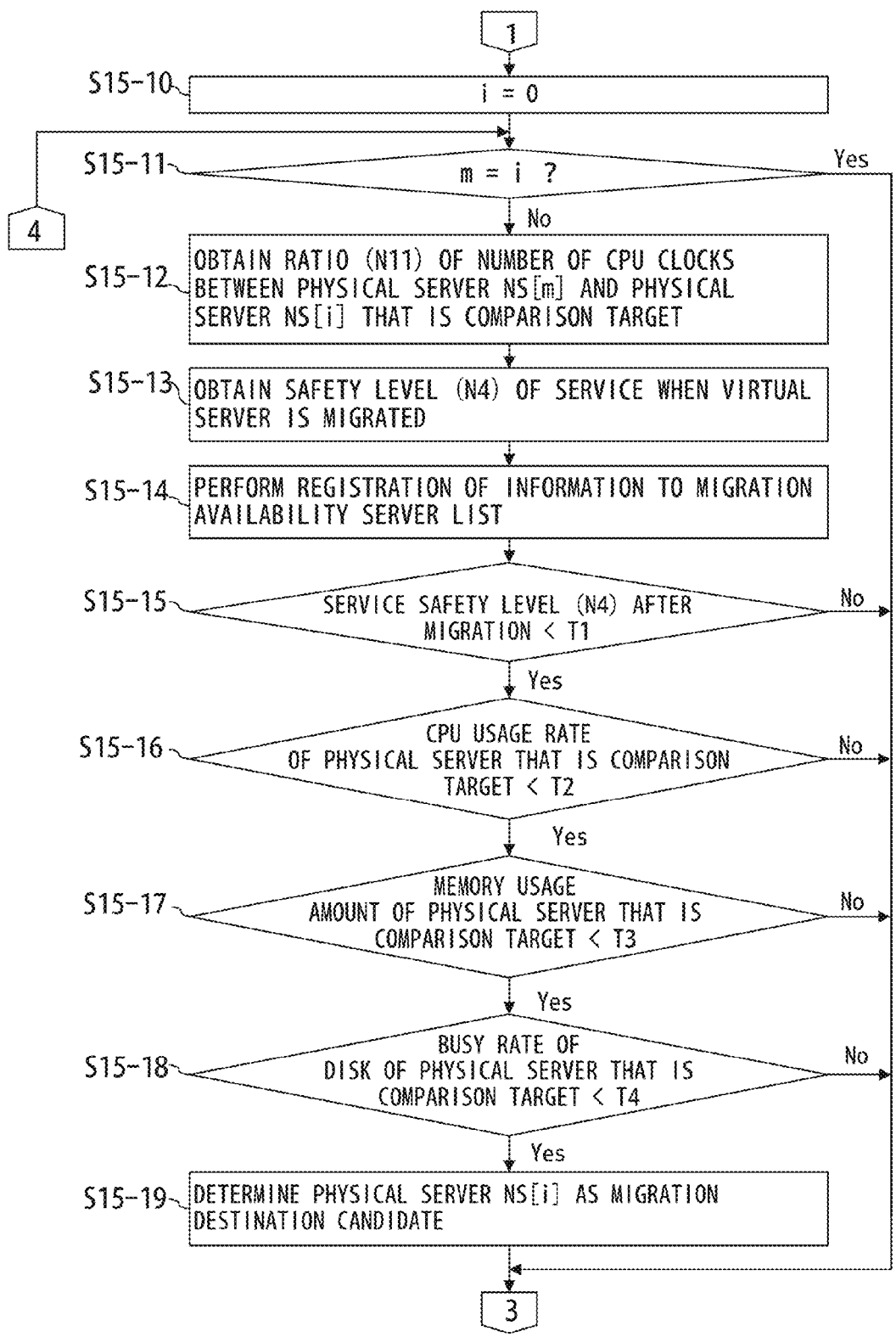
F I G. 15B

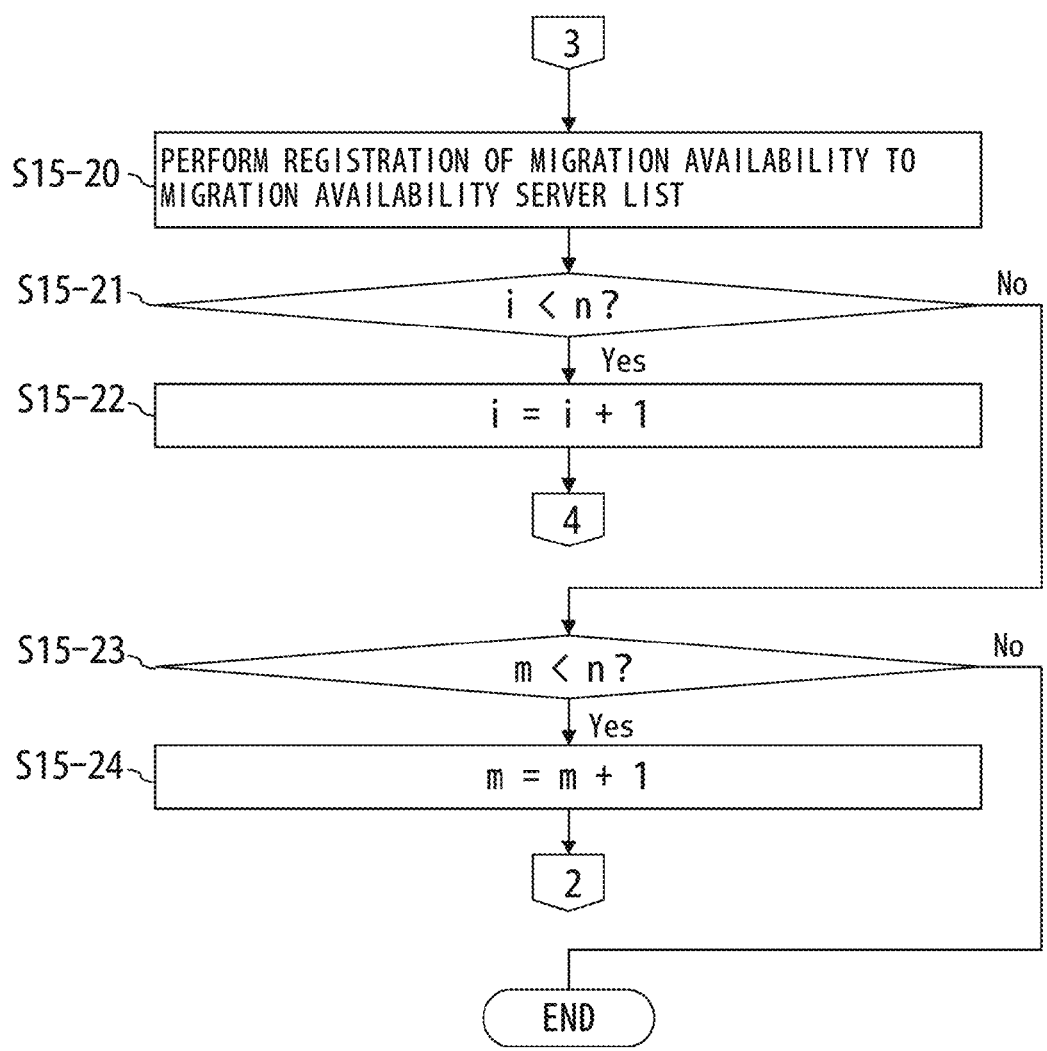
F I G. 15C

FIG. 16

| DAY | SERVICE | PHYSICAL SERVER THAT IS MIGRATION SOURCE (POWER OFF CANDIDATE) | VM | PHYSICAL SERVER THAT IS MIGRATION DESTINATION | SERVICE SAFETY LEVEL (N4) AFTER MIGRATION | CPU USAGE RATE (%) OF PHYSICAL SERVER THAT IS MIGRATION DESTINATION | MEMORY USAGE (%) OF PHYSICAL SERVER THAT IS MIGRATION DESTINATION | BUSY RATE (%) OF DISK OF PHYSICAL SERVER THAT IS MIGRATION DESTINATION | MIGRATION AVAILABILITY |
|---|---|---|---|---|---|---|---|---|---|
| 1ST OF DECEMBER | SERVICE A | NS11 | Web-1 | NS01 | 4.9 | 85 | 29 | 69 | × |
| 1ST OF DECEMBER | SERVICE A | NS09 | Web-2 | NS02 | 4.5 | 34 | 17 | 46 | × |
| 1ST OF DECEMBER | SERVICE A | NS10 | Web-3 | NS03 | 3.3 | 50 | 58 | 44 | × |
| 1ST OF DECEMBER | SERVICE A | NS08 | APL-1 | NS04 | 2.2 | 67 | 69 | 14 | ○ |
| 1ST OF DECEMBER | SERVICE A | NS09 | APL-2 | NS05 | 2.1 | 60 | 75 | 31 | × |
| 1ST OF DECEMBER | SERVICE A | NS10 | APL-3 | NS03 | 2 | 23 | 30 | 45 | ○ |
| 1ST OF DECEMBER | SERVICE A | NS10 | APL-4 | NS07 | 4.8 | 33 | 63 | 17 | × |
| 1ST OF DECEMBER | SERVICE A | NS09 | DB-1 | NS02 | 4.5 | 14 | 49 | 73 | × |

~90

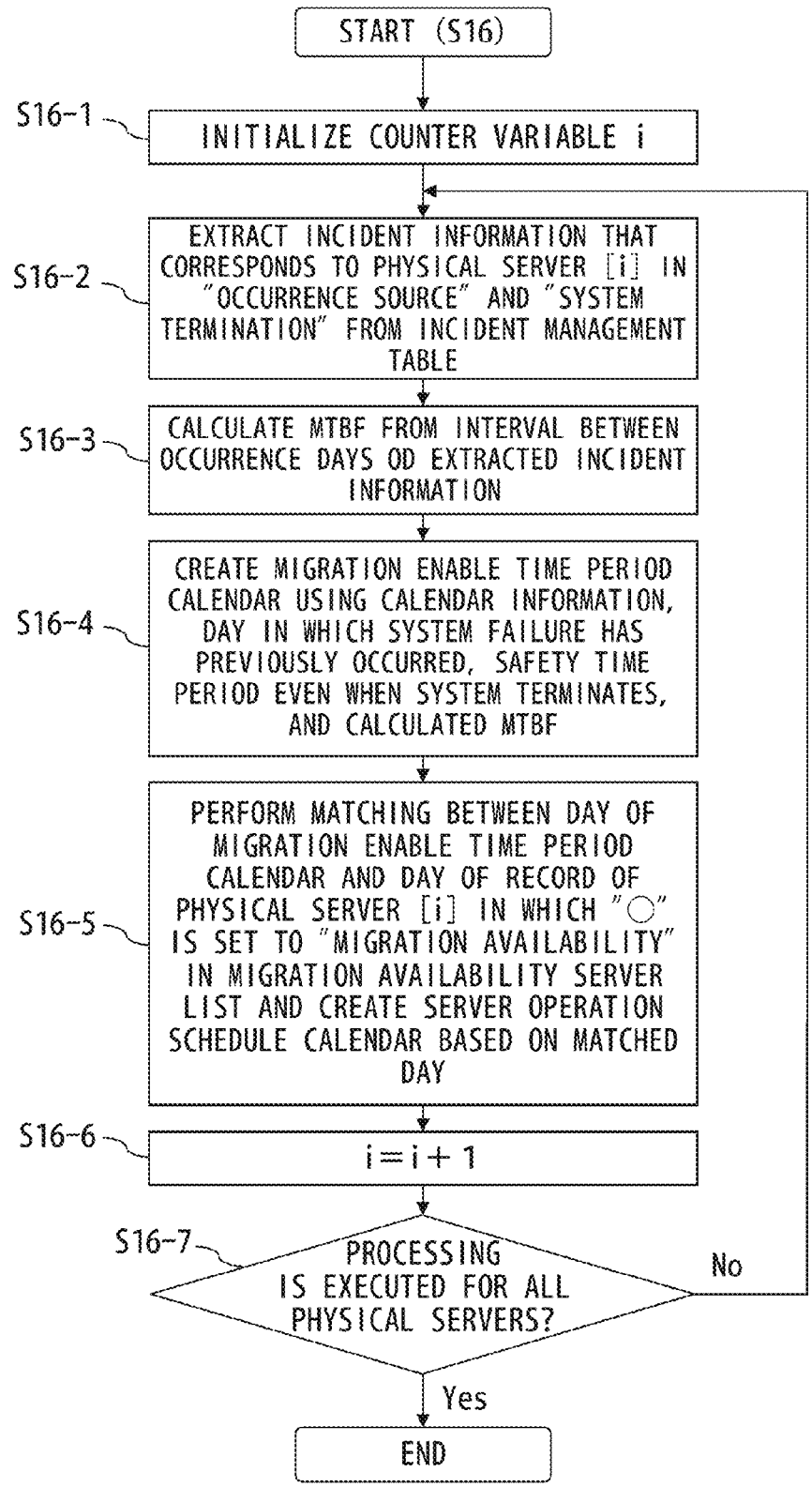
F I G. 17

| INCIDENT NUMBER | SEGMENT | CATEGORY 1 | OCCURRENCE SOURCE | OCCURRENCE DAY | MTBF | ... | CONTENT | SOLUTION DAY |
|---|---|---|---|---|---|---|---|---|
| I20110123-001 | FAILURE | SYSTEM TERMINATION | SERVER A | 2011/1/23 | 0 | ... | AP:XXXX:abend | 2011/1/24 |
| I20110203-001 | Q&A | OPERATION PROCEDURE | BUSINESS B | 2011/2/3 | | ... | INSTRUCTION OF OPERATION METHOD | 2011/2/3 |
| I20110215-001 | Q&A | OPERATION PROCEDURE | BUSINESS A | 2011/2/15 | | ... | NECESSITY OF INSTRUCTION OF PROCEDURE | 2011/2/15 |
| I20110227-001 | Q&A | OPERATION PROCEDURE | BUSINESS A | 2011/2/27 | | ... | NECESSITY OF INSTRUCTION OF PROCEDURE | 2011/2/27 |
| I20110303-001 | Q&A | OPERATION PROCEDURE | TERMINAL | 2011/3/3 | | ... | HOW TO START UP | 2011/3/3 |
| I20110311-001 | Q&A | OPERATION PROCEDURE | BUSINESS B | 2011/3/11 | | ... | INSTRUCTION OF OPERATION METHOD | 2011/3/11 |
| I20110315-001 | FAILURE | SYSTEM TERMINATION | SERVER A | 2011/3/15 | 51 | ... | AP:XXXX:abend | 2011/3/15 |
| I20110404-001 | FAILURE | SYSTEM TERMINATION | SERVER B | 2011/4/4 | | ... | Authentication Error | 2011/4/4 |
| I20110430-001 | Q&A | OPERATION PROCEDURE | BUSINESS A | 2011/4/30 | | ... | NECESSITY OF INSTRUCTION OF PROCEDURE | 2011/4/30 |
| I20110515-001 | FAILURE | SYSTEM TERMINATION | SERVER A | 2011/5/15 | 61 | ... | AP:XXXX:abend | 2011/5/15 |
| I20110530-001 | Q&A | OPERATION PROCEDURE | BUSINESS B | 2011/5/30 | | ... | INSTRUCTION OF OPERATION METHOD | 2011/5/30 |
| I20110609-001 | WORK REQUEST | OPERATION PROCEDURE | BUSINESS B | 2011/6/9 | | ... | INITIALIZATION OF PASSWORD | 2011/6/9 |
| I20110610-001 | Q&A | OPERATION PROCEDURE | BUSINESS A | 2011/6/10 | | ... | INSTRUCTION OF OPERATION METHOD | 2011/6/10 |
| I20110618-001 | Q&A | OPERATION PROCEDURE | BUSINESS B | 2011/6/18 | | ... | INSTRUCTION OF OPERATION METHOD | 2011/6/18 |
| I20110701-001 | Q&A | OPERATION PROCEDURE | BUSINESS B | 2011/7/1 | | ... | INSTRUCTION OF OPERATION METHOD | 2011/7/1 |
| I20110704-001 | FAILURE | SYSTEM TERMINATION | SERVER C | 2011/7/4 | | ... | Authentication Error | 2011/7/4 |

F I G. 18A

| INCIDENT NUMBER | SEGMENT | CATEGORY 1 | OCCURRENCE SOURCE | OCCURRENCE DAY | MTBF | ... | CONTENT | SOLUTION DAY |
|---|---|---|---|---|---|---|---|---|
| I20110731-001 | FAILURE | SYSTEM TERMINATION | SERVER A | 2011/7/31 | 71 | ... | AP:XXXX:abend | 2011/7/31 |
| I20110803-001 | Q&A | OPERATION PROCEDURE | BUSINESS B | 2011/8/3 | | ... | INSTRUCTION OF OPERATION METHOD | 2011/8/3 |
| I20110813-001 | Q&A | OPERATION PROCEDURE | BUSINESS C | 2011/8/13 | | ... | INSTRUCTION OF OPERATION METHOD | 2011/8/13 |
| I20110908-001 | Q&A | OPERATION PROCEDURE | BUSINESS B | 2011/9/8 | | ... | INSTRUCTION OF OPERATION METHOD | 2011/9/8 |
| I20110915-001 | FAILURE | SYSTEM TERMINATION | SERVER B | 2011/9/15 | | ... | Authentication Error | 2011/9/15 |
| I20110920-001 | FAILURE | SYSTEM TERMINATION | SERVER A | 2011/9/20 | 51 | ... | AP:XXXX:abend | 2011/9/20 |

F I G. 1 8 B

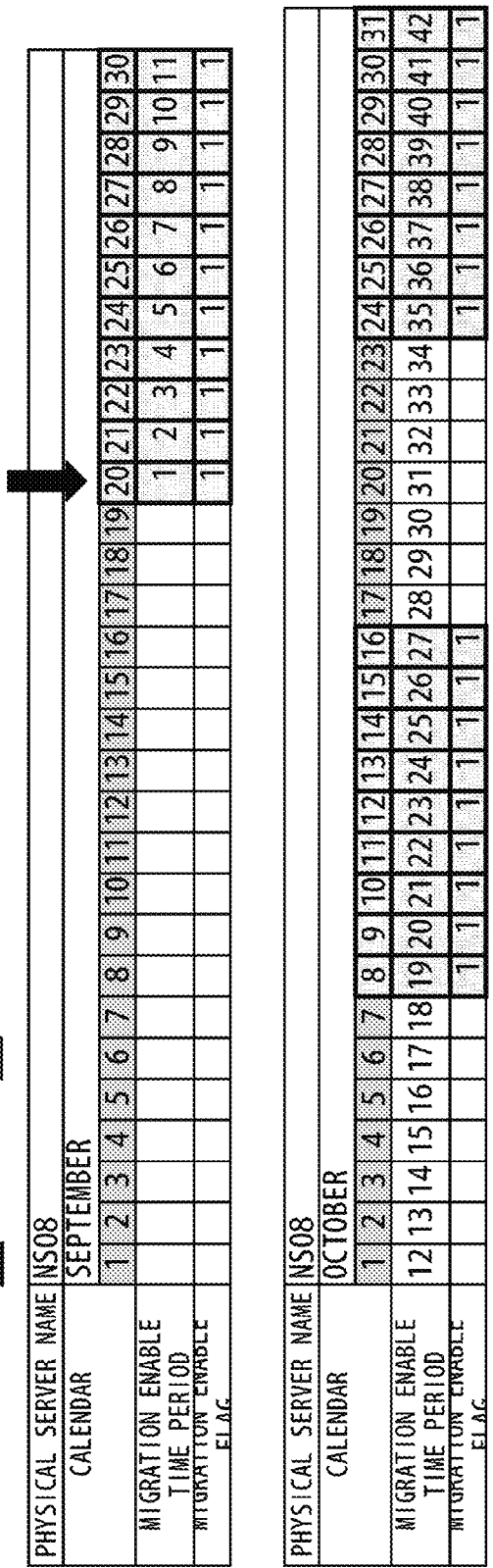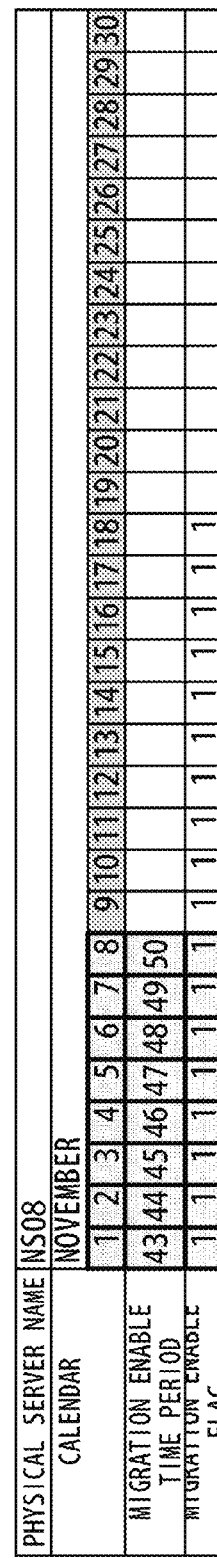
FIG. 20

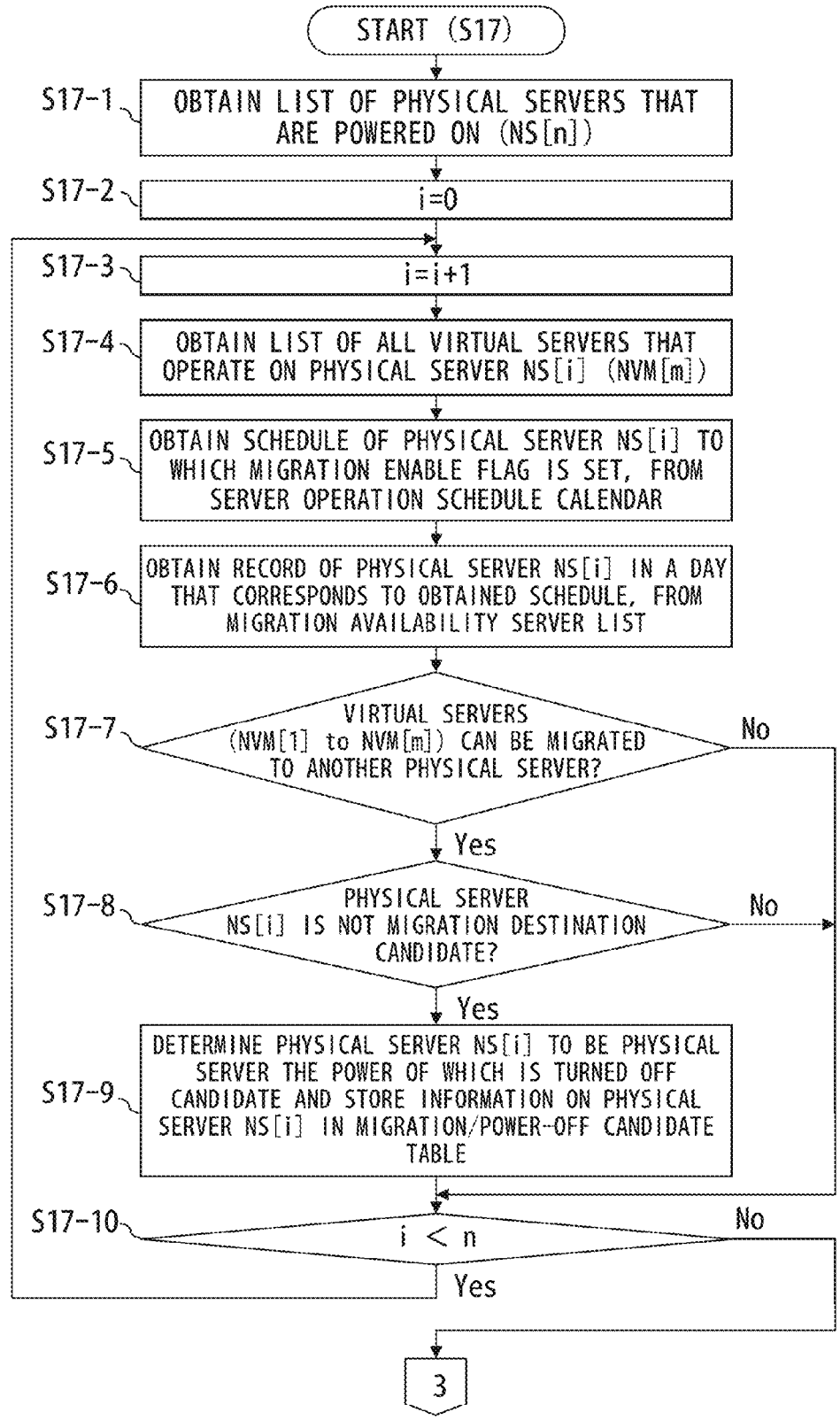
F I G. 21A

| DAY | SERVICE | PHYSICAL SERVER POWER OFF CANDIDATE BEFORE MIGRATION | VM | MIGRATION DESTINATION | ... | MIGRATION AVAILABILITY |
|---|---|---|---|---|---|---|
| 1ST OF DECEMBER | SERVICE A | NS08 | APL-1 | NS04 | ... | ○ |
| 1ST OF DECEMBER | SERVICE B | NS08 | APL-1 | NS02 | ... | ○ |
| 1ST OF DECEMBER | SERVICE C | NS08 | APL-1 | NS01 | ... | ○ |
| 1ST OF DECEMBER | SERVICE A | NS09 | APL-2 | NS05 | ... | × |
| 1ST OF DECEMBER | SERVICE B | NS09 | APL-2 | NS05 | ... | ○ |
| 1ST OF DECEMBER | SERVICE B | NS09 | DB-1 | NS03 | ... | × |
| 1ST OF DECEMBER | SERVICE C | NS09 | DB-1 | NS01 | ... | ○ |
| 1ST OF DECEMBER | SERVICE D | NS04 | APL-3 | NS06 | ... | ○ |
| 1ST OF DECEMBER | SERVICE E | NS04 | APL-3 | NS07 | ... | ○ |
| 1ST OF DECEMBER | SERVICE F | NS04 | APL-3 | NS03 | ... | ○ |
| ... | ... | ... | ... | ... | ... | ... |

- INFORMATION IS STORED IN MIGRATION/POWER-OFF TABLE (rows 1–3)
- POWER-OFF IS NOT ENABLED BECAUSE NOT ALL VIRTUAL SERVERS ARE ENABLED TO BE MIGRATED (rows 4–7)
- POWER-OFF IS NOT ENABLED BECAUSE PHYSICAL SERVER IS MIGRATION DESTINATION CANDIDATE (rows 8–10)

F I G. 22

| DAY | SERVICE | PHYSICAL SERVER POWER OFF CANDIDATE BEFORE MIGRATION | VM | MIGRATION DESTINATION |
|---|---|---|---|---|
| 1ST OF DECEMBER | SERVICE A | SV08 | APL-1 | SV04 |
| 1ST OF DECEMBER | SERVICE B | SV08 | APL-1 | SV02 |
| 1ST OF DECEMBER | SERVICE C | SV08 | APL-1 | SV01 |
| ... | ... | ... | ... | ... |

130

F I G. 2 3

| MIGRATION TARGET SERVICE NAME | MIGRATION TARGET TIME ZONE | MIGRATION SOURCE PHYSICAL SERVER NAME | VIRTUAL SERVER NAME | MIGRATION DESTINATION PHYSICAL SERVER NAME | OPERATIONAL CONSUMPTION POWER (W) BEFORE MIGRATION | OPERATIONAL CONSUMPTION POWER (W) AFTER MIGRATION | REDUCTION POWER (W) (OPERATIONAL CONSUMPTION POWER BEFORE MIGRATION- OPERATIONAL CONSUMPTION POWER AFTER MIGRATION) |
|---|---|---|---|---|---|---|---|
| SERVICE A | 06:00:00 ~ 18:00:00 | SV1 | VM1 | SV6 | 2000 | 1600 | 400 |
| SERVICE A | 12:00:00 ~ 14:00:00 | SV2 | VM2 | SV7 | 1500 | 1000 | 500 |
| SERVICE B | 00:00:00 ~ 23:59:59 | SV3 | VM1 | SV8 | 1500 | 1200 | 300 |
| | | | | | | TOTAL | 1200 |

F I G. 24

APPARATUS FOR MIGRATING VIRTUAL MACHINES TO ANOTHER PHYSICAL SERVER, AND METHOD THEREOF

CROSS-REFERENCE TO RELATED APPLICATION

This application is based upon and claims the benefit of priority of the prior Japanese Patent Application No. 2012-287748, filed on Dec. 28, 2012, the entire contents of which are incorporated herein by reference.

FIELD

The present invention relates to a technology to control an information processing system.

BACKGROUND

In recent years, a virtualization technology by which a plurality of virtual machines (VM) is operated on a single server at the same time has been prevailed. By using the virtualization technology, an operating system (OS) can be operated in each of the VMs. Therefore, a plurality of OS can be operated in parallel on the single server, and a server resource can be utilized effectively.

In addition, there has been a need for effective use of resources of a computer system that includes a plurality of physical servers. As such a technology by which the resources of the computer system are used effectively, for example, there are the following technologies.

As a first technology, there is a technology by which resources are automatically reallocated on the basis of a measurement result based on a service level target correspondingly to various types of applications. In the first technology, a table of resources that include a server, a network, and a storage, an application table that indicates configuration elements of an application that operates on these resources, and a table of allocation of the resources to the application are held. A performance measurement item template that is used to generate a measurement item of performance information from these pieces of configuration information, a performance measurement unit that measures the measurement item of the performance information using a performance measurement engine, and a resource allocation change rule that is used for reallocating resources from the configuration information are generated. The reallocation of resources is performed in accordance with the generated resource allocation change rule and configuration information.

As a second technology, there is a technology by which remigration of a virtual server is reduced. In the second technology, the virtual server is connected to a plurality of physical servers on which the virtual servers can be operated, and a virtual server migration control device that migrates the virtual server that operates in any of the plurality of physical servers to another physical server executes the following processing. The virtual server migration control device detects loads on the plurality of physical servers and calculates a time period during which a load smaller than a predefined low load determination threshold value is detected, for each of the physical servers. The virtual server migration control device identifies a migration destination physical server that is a migration destination of the virtual server from among the plurality of physical servers using the calculated time period, and causes the virtual server to be migrated to the identified migration destination physical server.

In a third technology, in a computer system in which a plurality of servers are connected to each other through a network and one or more businesses are running, a power reduction mechanism of a management server migrates the business under a certain condition to reduce power that is consumed by the computer system.

In a fourth technology, deployment server candidates are selected depending on failure possibility of a spare server in a dynamic deployment time period, a deployment server candidate that can satisfy requirements of deployment to a system is selected from the deployment server candidates and is determined to be a deployment server. Therefore, for a required time period, a server is dynamically deployed to a system the performance of which is insufficient.

Patent literature 1: Japanese Patent Laid-Open No. 2005-174201

Patent literature 2: Japanese Patent Laid-Open No. 2009-116380

Patent literature 3: Japanese Patent Laid-Open No. 2011-90704

Patent literature 4: International Publication No. WO 2008/041302

SUMMARY

According to apparatus for controlling an information processing system, the apparatus includes a memory and a control unit. The control unit is configured to perform a process including: obtaining response information that includes a result of processing executed by a virtual machine that operates on a first information processing device, in response to request information that is transmitted to the information processing system that includes a plurality of information processing devices, the first information processing device being included in the plurality of information processing devices; calculating a first evaluation value that is used to evaluate a response time from transmission of the request information to reception of the response information; calculating a ratio of processing capability of the first information processing device to processing capability of a second information processing device, the second information processing device being included in the plurality of information processing devices; calculating, based on the first evaluation value and the ratio, a second evaluation value that is used to evaluate a processing time from transmission of the request information to reception of the response information when the virtual machine operates on the second information processing device; determining the second information processing device to be a migration destination candidate of the virtual machine when the calculated second evaluation value is smaller than a first threshold value; and migrating the virtual machine that operates on the first information processing device to the migration destination candidate to turn off power of the first information processing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an information processing system control device in an embodiment.

FIG. 3 illustrates an example of physical server management information in the embodiment.

FIG. 4 illustrates an example of virtual server management information in the embodiment.

FIG. 5 illustrates an example of service management information in the embodiment.

FIG. 6 illustrates an example of a safety level table in the embodiment.

FIG. 7 illustrates an example of operation information of a virtual server in the embodiment.

FIG. 10 illustrates a data structure example of an appearance rate information (Y00-1) analysis table or an appearance rate information (Y00-2) analysis table in the embodiment.

FIG. 11 illustrates an example of a time zone candidate table in the embodiment.

FIG. 13 is a diagram illustrating reading-out of record groups [j], [j+1], . . . , and [j+Y] of consecutive hours from the appearance rate information (Y00-2) analysis table in the embodiment.

FIGS. 15A-15C illustrate an example of a flow of selection processing (S15) of a virtual server to be migrated and a physical server that is a migration destination in the embodiment.

FIG. 16 illustrates an example of a migration availability server list in the embodiment.

FIG. 17 illustrates an example of a flow of exclusion processing in the case where there is no power consumption effect (availability verification of a physical server candidate that is a migration destination) (S16) in the embodiment.

FIGS. 18A and 18B illustrates an example of an incident management table in the embodiment.

FIG. 20 illustrates an example of a server operation schedule calendar in the embodiment.

FIGS. 21A and 21B illustrate an example of a flow of processing of migration of a virtual server and power-off processing of a physical server (S17) in the embodiment.

FIG. 22 is a diagram illustrating processing of S17-7 to S17-9.

FIG. 23 illustrates an example of a migration/power-off candidate table in the embodiment.

FIG. 24 illustrates an output example of a power consumption reduction amount after migration in the embodiment.

DESCRIPTION OF EMBODIMENTS

Figure 2:
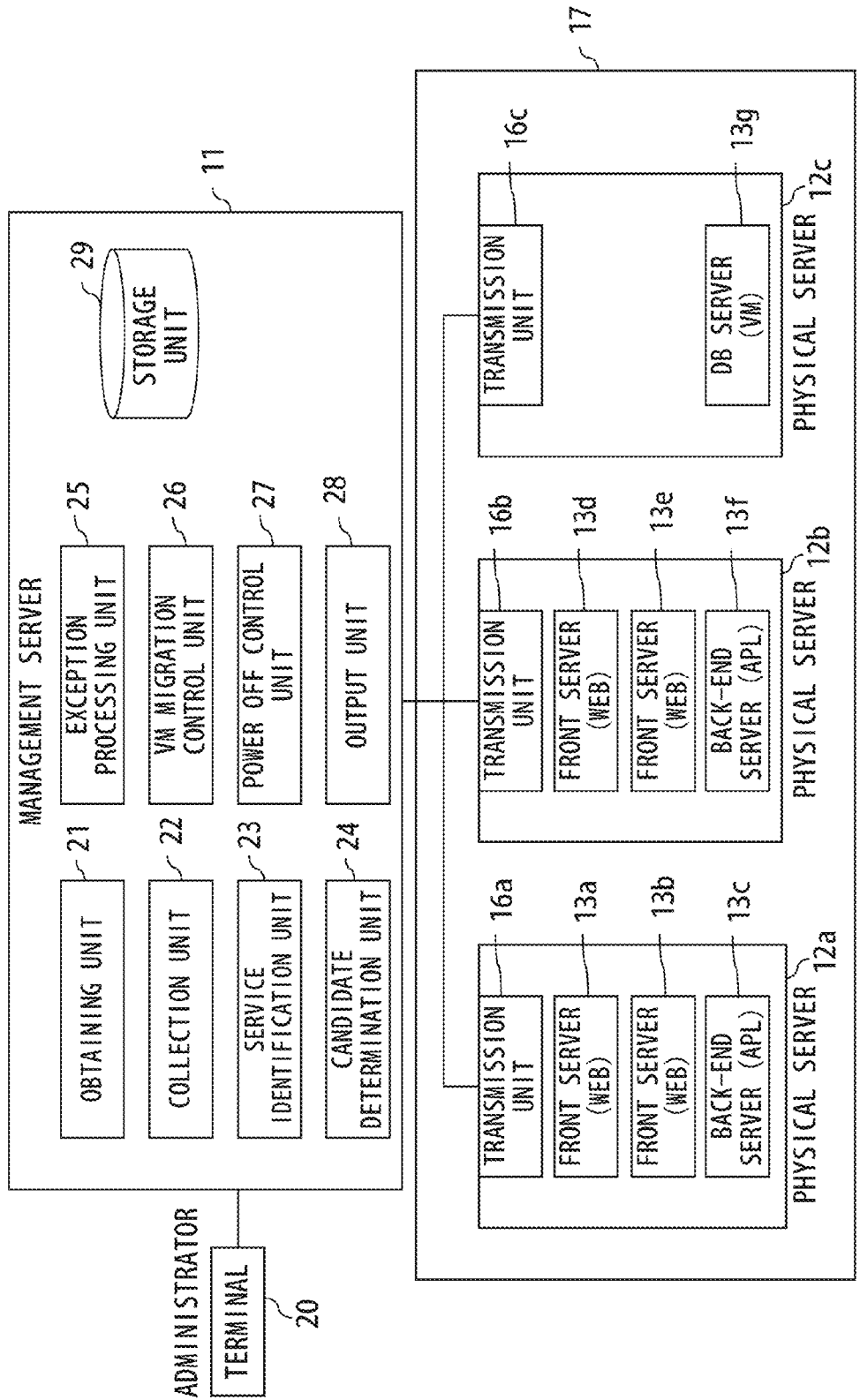
FIG. 2 illustrates a configuration example of a server management system in the embodiment.

Users of a data center, however, request performance target (service level) for each business service, but in the above-described technology, reduction in power consumption of the information processing system based on the service level is not considered.

As an aspect of the present invention, there is provided a technology for reducing power consumption of the information processing system while the service level is taken into consideration.

As described above, efficient utilization of resources of a computer system has being required. For example, as the efficient utilization of resources of the computer system, an energy-efficient large-scale data center that is represented by a cloud has being required. The large-scale data center performs collective management in cloud computing by which collective management of hardware, software, data, and the like is performed, as a new utilization form of information and communication technology (ICT) system construction.

The power consumption in the data center is mainly classified into two types: (i) power of an air conditioning facility to reduce heat that is caused by hardware, and (ii) usage power of hardware (server, network device, and the like).

As reduction measures of (i) power of the air conditioning facility, it is conceivable that the data center is installed in a cold region.

As reduction measures of (ii) usage power of the hardware, it is conceivable that, in a service that operates in a plurality of physical servers, the number of operating physical servers is reduced by virtualization and integration of a server and the usage power is reduced. The server virtualization integration refers to an operation of a plurality of virtual servers on, for example, a single physical server. By operating a system, which has been operated in a plurality of physical servers by that time, in a single physical server, the number of servers can be physically reduced.

In the above-described server virtualization integration, the number of operating physical servers is further reduced by migrating the virtual server to another physical server using a performance measurement value in a unit of virtual server without departing from a range of the performance target value of the virtual server. As the performance measurement value, for example, there is the following IT equipment utilization (ITEU) as an index that indicates that how much processing capability of a device that is introduced to the data center is actually used.

ITEU=total measured power of an IT device/total rated power of the IT device.

In the server virtualization integration, it is required that the following matters are considered. There are many cases where a business service (may be simply referred to as service) is provided by a plurality of servers such as a WEB server, an application (APL) server, a database (BD) server. Here, the business service refers to providing a result that is processed by a front server, the DB server, a back-end server, and the like when there is a request from the user to a business system, and refers to a series of pieces of processing until the provision of the result or a server that executes the series of pieces of processing.

There is a difference in the usage frequency (load) of the business service depending on a time zone. In addition, the performance target (service level) that is required by the user of the data center corresponds to a unit of the business service.

Therefore, in order to suppress excessive power consumption of the data center while the demand of the user of the data center is satisfied, it is required that the virtual server is migrated in the unit of business service, and the number of operating physical servers is reduced.

In the embodiment, in order to suppress the excessive power consumption of the data center while the demand of the user of the data center is satisfied, the virtual server is migrated in the unit of business service, and the number of operating physical servers is reduced. As an example in which the service level is increased and extra power is consumed, the following cases are considered.

The usage is concentrated in the daytime, and the usage frequency is low in the night time, in a time zone of one day.

The usage is concentrated in the weekday, and the usage frequency is low in the weekend.

The usage is concentrated at the end of a period, and the usage frequency is low during the period.

Hereinafter, a time zone having a high service level is determined from the service level state of the business service (tendency in a short, medium, long term). In addition, without departing from a range of a service level agreement (SLA) value, a physical server on which the virtual server is operated is changed, and the number of operating physical servers (physical servers the powers of which are turned on) is reduced.

FIG. 1 illustrates an information processing system control device in an embodiment. An information processing system control device 1 includes an obtaining unit 2, a determination unit 3, and a control unit 4. As an example of the information processing system control device, there is a management server 11.

The obtaining unit 2 obtains response information that includes a result of processing executed by a virtual machine 8 that operates in a first information processing device 7-1 among a plurality of information processing devices 7, in response to request information that is transmitted to an information processing system 6 that is constituted by the plurality of information processing devices 7. As an example of the obtaining unit 2, there is a collection unit 22.

The determination unit 3 calculates a first evaluation value that is used to evaluate a response time from transmission of the request information to reception of the response information. The determination unit 3 calculates a ratio of processing capability of the first information processing device 7-1 to processing capability of a second information processing device 7-2 among the plurality of information processing devices. The determination unit 3 uses the first evaluation value and the ratio to calculate a second evaluation value that is used to evaluate a processing time from transmission of the request information to reception of the response information when the virtual machine 8 operates in the second information processing device. The determination unit 3 determines the second information processing device 7-2 to be a migration destination candidate of the virtual machine 8 when the calculated second evaluation value is smaller than a first threshold value. In addition, the determination unit 3 determines the second information processing device 7-2 to be the migration destination candidate of the virtual machine when a value of a usage rate of a resource of the second information processing device 7-2 is smaller than a second threshold value. As an example of the determination unit 3, there is a candidate determination unit 24.

The control unit 4 migrates the virtual machine 8 that operates in the first information processing device 7-1 to the migration destination candidate and turns off power of the first information processing device 7-1. The control unit 4 determines the migration destination candidate for each of the plurality of information processing devices when a plurality of virtual machines operates in the first information processing device 7-1 and the response information is processed by all or a part of the virtual machines among the plurality of virtual machines. The control unit 4 migrates all or a part of the virtual machines that perform the processing on the migration destination candidate when the first information processing device 7-1 is not determined to be the migration destination candidate. Examples of the control unit 4 include a VM migration control unit 26 and a power-off control unit 27.

By the above-described configuration, the migration of the virtual server is performed in the unit of business service, so that the power of the server that is a migration source is turned off and the number of operating physical servers can be reduced. Therefore, power consumption of the information processing system can be suppressed while the safety level of the service is taken into consideration.

The control unit 4 calculates mean time between failures (MTBF) using failure history information of the second information processing device 7-2. The control unit 4 obtains the most recent failure occurrence day from the failure history information. The control unit 4 calculates a next failure occurrence predicted day from the failure occurrence day and the MTBF. The control unit 4 migrates the virtual machine that operates in the first information processing device to the migration destination candidate in any day during a time period from the most recent failure occurrence day to the next failure occurrence predicted day, and turns off the power of the first information processing device.

By the above-described configuration, migration of the virtual machine can be performed in a time period during which a probability that failure does not occur in the migration destination candidate is high.

The information processing system control device further includes an identification unit 5. The identification unit 5 calculates an evaluation value that is used to evaluate processing performance from transmission of the request information to reception of the response information. The identification unit 5 calculates an appearance rate of an evaluation value for each of evaluation values in a first unit of time. The identification unit 5 identifies a first time zone in which any of the appearance rates exceeds a threshold value in the evaluation values. As an example of the identification unit 5, there is a service identification unit 23.

By the above-described configuration, a time zone having a high service level can be determined from the service level state (tendency in a short, medium, or long term) of the business service.

In addition, the identification unit 5 calculates an appearance rate of the evaluation value for each of the evaluation values in a second unit of time, which is a lower-level of the first unit of time, and identifies a second time zone in which any of the appearance rates exceeds a threshold value in the evaluation values, out of consecutive time zones in the second unit of time. An example of the identification unit 5, there is an exception processing unit 25.

By the above-described configuration, an appearance rate of a safety level of a service that is biased depending on a time zone is considered, and the service can be identified.

In addition, the identification unit 5 excludes the identified first time zone when the identified first time zone includes a certain day or a certain time zone, and excludes the identified second time zone when the length of the identified second time zone is shorter than a threshold value. As an example of the identification unit 5, there is the exception processing unit 25.

By the above-described configuration, power consumption due to frequent migration can be prevented.

Hereinafter, the embodiment is described in detail.

FIG. 2 illustrates a configuration example of a server management system in the embodiment. In the server management system, the management server 11 and a data center 17 (physical servers 12 (12a, 12b, and 12c)) are connected to each other through a certain communication network. The management server 11 is connected to an information processing terminal (hereinafter, referred to as "terminal") 20 through a certain network such as the Internet or a local area network (LAN). An administrator uses the terminal 20 to input service level information of configuration information that is included in the business system and a certain parameter.

The physical server 12 functions as plurality of virtual servers (virtual machine: VM) by executing a virtual machine monitor (VMM) as a virtualization program.

In the data center 17, the physical servers 12 are connected to each other through a certain network. The physical server 12 includes hardware, a VMM, and a plurality of virtual servers 13. The hardware corresponds to a physical device group that includes a real CPU (central processing unit) and a real storage device. The hardware is described later. The VMM corresponds to a program that is used to provide a virtual hardware environment for the virtual server 13 in order to control so as to operate the plurality of virtual servers 13 in the physical server 12. Specifically, the VMM performs dispatch of an OS of each of the virtual servers 13 (control right allocation of physical CPUs), emulation of privileged instruction that is executed by each of the OSs, and control of the hardware such as the physical CPU.

Each of the virtual servers 13 corresponds to a virtual computer that operates on the VMM independently of another virtual server 13. Each of the virtual servers 13 is achieved when each of the OSs obtains control right of the physical CPU that is hardware through the VMM and is executed on the CPU.

For example, in the physical server 12a, virtual servers such as front servers 13a and 13b, a back-end server 13c operate. In the physical server 12b, virtual servers such as front servers 13d and 13e, a back-end server 13f operate. In the physical server 12c, a virtual server such as a DB server 13g operates. In such an example, the front server corresponds to a WEB server, but not limited to the WEB server. In such an example, the back-end server corresponds to an APL server, but not limited to the APL server.

In addition, the physical servers 12a, 12b, and 12c respectively include transmission units 16a, 16b, and 16c. The transmission units 16a, 16b, and 16c respectively transmit pieces of operation information of the physical servers 12a, 12b, and 12c, or pieces of operation information of virtual servers that operate in the physical servers 12a, 12b, and 12c to the management server 11.

The management server 11 includes the obtaining unit 21, the collection unit 22, the service identification unit 23, the candidate determination unit 24, the exception processing unit 25, the VM migration control unit 26, the power-off control unit 27, an output unit 28, and a storage unit 29. The obtaining unit 21 obtains information that is input by the administrator from the terminal 20.

The collection unit 22 obtains operation information of the physical server or the virtual server, which is transmitted by the transmission units 16a, 16b, and 16c.

The service identification unit 23 analyzes the operation information that is obtained by the collection unit 22 and identifies a candidate of a service to be migrated.

The candidate determination unit 24 determines a candidate of a virtual server that can be migrated and a candidate of a physical server that can be a migration destination on the basis of the operation information of the physical server and the virtual server related to the identified service and the information that is obtained from the terminal 20.

The VM migration control unit 26 determines whether or not a physical server on which the virtual server that can be migrated is operated can be turned off, and migrates the virtual server to the physical server that is a migration destination when the power-off is possible. The power-off control unit 27 transmits a command to turn off the power of the physical server that is a migration source, to the physical server.

The output unit 28 outputs information on a power consumption reduction amount of the whole system after the virtual server has been migrated, to an output device such as a display device and a printer.

The storage unit 29 is a device that includes a storage function such as a transitory storage device or a large capacity storage device. In the storage unit 29, a work table, system configuration information, information that is obtained from the terminal 20, and operation information that is obtained by the collection unit 22 are stored. The system configuration information includes physical server management information that is used to manage specification or the like of a physical server, virtual server management information that is used to manage a virtual server that operates on a physical server, and service management information that is used to manage a service.

FIG. 3 is an example of physical server management information in the embodiment. Physical server management information 30 is stored in the storage unit 29. The physical server management information 30 includes data items of "physical server name", "number of clocks", "CPU usage rate", "memory usage rate", and "busy rate of a disk". In "physical server name", a name that identifies a physical server is stored. In "number of clocks", the number of clocks of a processor that is installed in the physical server is stored. In "CPU usage rate", a usage rate of the processor is stored. In "memory usage rate", a usage rate of a memory that is installed in the physical server is stored. In "busy rate of a disk", a busy rate of a hard disk or the like that is installed in the physical server is stored.

FIG. 4 illustrates an example of virtual server management information in the embodiment. Virtual server management information 40 is stored in the storage unit 29. The virtual server management information 40 includes data items of "physical server name" and "virtual server name". In "physical server name", a name that identifies a physical server is stored. In "virtual server name", one or more names each of which identifies a virtual server that operates on the physical server are stored.

FIG. 5 illustrates an example of service management information in the embodiment. Service management information 50 is stored in the storage unit 29. The service management information 50 includes data items of "service name", "virtual server name", and "average online response time". In "service name", a name that identifies a service is stored. In "virtual server name", a name that identifies a virtual server that performs the service is stored. In "average online response time", an average online response time from request for the service to response to the request is stored.

FIG. 6 illustrates an example of a safety level table in the embodiment. A safety level table 55 is a table that manages a SLA value of a business service, and is stored in the storage unit 29. The safety level table 55 is a table that indicates a relationship between a safety level and a ratio of an online response time to SLA. When the safety level is 1, a ratio of an online response time to SLA corresponds to 0% to 20%. When the safety level is 2, a ratio of an online response time to SLA corresponds to 20% to 40%. When the safety level is 3, a ratio of an online response time to SLA corresponds to 40% to 60%. When the safety level is 4, a ratio of an online response time to SLA corresponds to 60% to 80%. When the safety level is 5, a ratio of an online response time to SLA corresponds to 80% to 100%.

FIG. 7 illustrates an example of operation information of a virtual server in the embodiment. Operation information 56 of a virtual server includes pieces of information A01 to A19. The management server 11 obtains the operation information 56 of a virtual server from the virtual server to analyze the virtual server to be migrated, and stores the operation information 56 in the storage unit 29. Information A01 corresponds to a time at which a request is input to a front server. Information A02 corresponds to a time at which the request is output from the front server (to a back-end server). Information A03 corresponds to a time at which the request is input to the back-end server. Information A04 corresponds to a time at which the request is output from the back-end server (to a DB server). Information A05 corresponds to a time at which the request is input to the DB server. Information A06 corresponds to a time at which a response is output from the DB server (to the back-end server). Information A07 corresponds to a time at which the response comes into the back-end server. Information A08 corresponds to a time at which the response is output from the back-end server (to the front server). Information A09 corresponds to a time at which the response is input to the front server (from the back-end server). Information A10 corresponds to a time at which the response is output from the front server. Information A11 corresponds to a CPU usage rate of the front server. Information A12 corresponds to a memory usage amount of the front server. Information A13 corresponds to an input/output (I/O) busy rate of a disk of the front server. Information A14 corresponds to a CPU usage rate of the back-end server. Information A15 corresponds to a memory usage amount of the back-end server. Information A16 corresponds to an I/O busy rate of a disk of the back-end server. Information A17 corresponds to a CPU usage rate of the DB server. Information A18 corresponds to a memory usage amount of the DB server. Information A19 corresponds to an I/O busy rate of a disk of the DB server.

Figure 8:
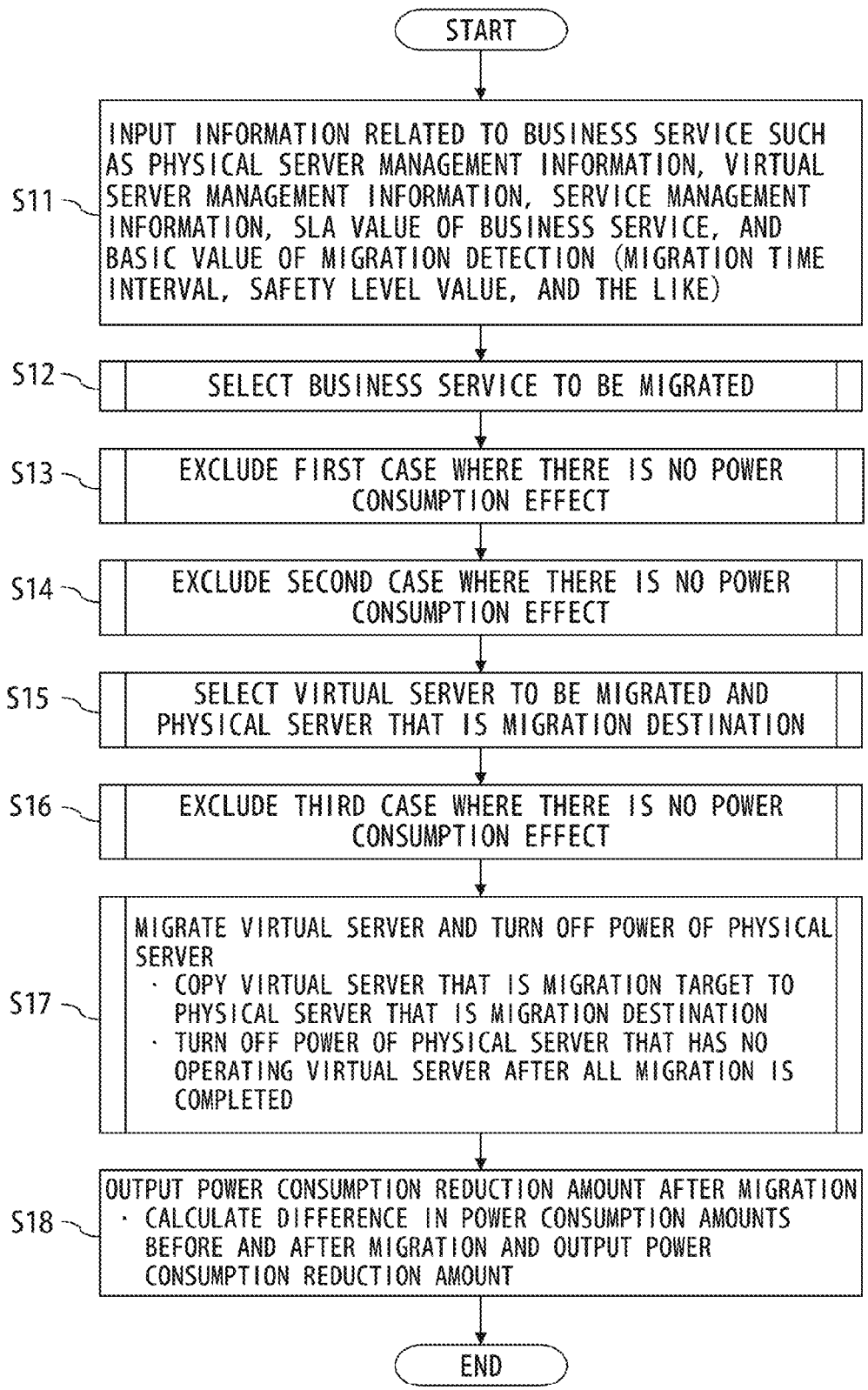
FIG. 8 illustrates an example of an entire processing flow of the server management system in the embodiment.

FIG. 8 illustrates an example of the entire processing flow of the server management system in the embodiment. When the administrator uses the terminal 20 to input information related to a business service to the management server 11 (S11), the management server 11 stores the input information in the storage unit 29. The information related to the business service includes, the physical server management information 30, the virtual server management information 40, the service management information 50, a SLA value of the business service, a basic value that is used to migrate a server (migration time interval, safety level value, and the like).

The management server 11 executes processing of selecting a business service to be migrated (S12). The management server 11 obtains basic information of the business service and operation information of the business service from a physical server that includes a virtual server to analyze the business service to be migrated. The basic information of the business service corresponds to system configuration information and service level information. The system configuration information corresponds to information on a configuration of a physical server and information on a configuration of a virtual server that operates on the physical server. The operation information of the business service includes information on an average online response time of the business service.

The management server 11 obtains "time at which a request is input to the front server (for example, Web server)" and "time at which a response is output from the front server" from the physical server 12, as the operation information of the business service. The management server 11 aggregates/analyzes the obtained operation information in "unit of hour", "unit of day", "unit of month", or "unit of quarter".

After that, the management server 11 classifies a service level value (=online response time/average online response time×100%) into safety levels (for example, five stages) and selects a business service candidate to be migrated on the basis of the safety level.

Here, the management server 11 classifies a service level value (online response time) into the safety levels (five stages). As an index that is used to measure safety of the service level, for example, safety levels that are segmented into the five stages are defined.

Safety level 1: The safety is high, and there is sufficient processing capability.

Safety level 2: The safety is high, and there is some sufficient processing capability.

Safety level 3: The safety is high, but there is no sufficient processing capability.

Safety level 4: The safety is slightly low.

Safety level 5: The safety is low.

In addition, the management server 11 selects a migration service candidate from the operation information that is aggregated/analyzed on the basis of the safety level. The management server 11 selects a service in which an appearance rate of a safety level n is m % or more from the data that is obtained by performing aggregation in a unit of aggregation (hour/day/month/quarter). That is, the management server 11 analyzes the specified safety level and the appearance rate in the certain unit of time, and detects a service having a high safety level and the time zone.

After that, the management server 11 excludes a first case where there is no power consumption effect, from the selected business services (S13). Here, the management server 11 executes processing in which exception due to a difference in an aggregation time interval is considered. In the migration service candidate that is selected in S12, there is a case where inconsistency occurs in the detection result due to the difference in an aggregation time interval such as day, month, or the like.

For example, it is assumed that, in a case of data that is obtained by performing aggregation in the unit of "month", when a day in which the safety level n for each day exceeds m % is detected, there is a case where only a certain time zone of a certain day is different from the result that is obtained by performing aggregation in the unit of day. In this case, the detected candidate may be wrong. Therefore, the management server 11 also performs analysis in a unit of aggregation, which is a lower level of the adopted unit of aggregation, and corrects the detection result as exception of the unit of aggregation during a time in which a time zone of the lower level elapses for a certain time.

After that, the management server 11 excludes a second case where there is no power consumption effect, from the selected business services (S14). Here, the management server 11 executes processing of preventing frequent server migration from a viewpoint of power consumption. That is, there is a case where migration in the unit of one hour or a time zone at the peak time of power consumption is determined as a candidate, as the aggregation time candidate that is selected in S12. There is a case where, in the migration in the unit of one hour, an intended power consumption reduction is not obtained when the migration time is considered. A migration enable minimum time interval is set beforehand by considering such a case, and the migration within time range is eliminated from the candidate.

In addition, the management server 11 executes processing of selecting a virtual server to be migrated and a physical server candidate that is a migration destination for the selected business service (S15). The management server 11 obtains the operation information 56 of the virtual server, which is used to analyze the virtual server to be migrated, from the physical server 12.

The management server 11 calculates processing performance information of each of the virtual servers in response to a request for the service (online response time, a processing time of each of the virtual servers, an occupation proportion of the processing time of each of virtual servers in an online response time) from the obtained operation information 56 of the obtained virtual server.

The management server 11 selects a virtual server candidate that is a migration target and a physical server candidate that is a migration destination. Here, the management server 11 detects the physical server candidate that is a migration destination of the virtual server on the basis of a safety level of the service after migration and a processing capability of the physical server that is a migration destination.

The management server 11 excludes a third case where there is no power consumption effect, from the selected physical server candidates that are migration destinations (S16). Here, the management server 11 verifies availability of the migration destination physical server candidate. The management server 11 verifies server migration from a viewpoint of the availability for the migration destination physical server that is detected as a candidate in S15. The above-described processing is performed in order to prevent deterioration of a service level of the availability with the server migration beforehand.

First, the management server 11 calculates MTBF of the physical server that is a migration destination candidate from the operation result. Here, in the storage device of the management server 11, a failure history of the physical server is recorded as incident data, so that the management server 11 calculates MTBF of the physical server using the incident data. In addition, the management server 11 may calculate MTBF by adding MTBF of a physical server the type of which is the same as that of the physical server to the calculated MTBF.

After that, the management server 11 verifies the availability of the migration candidate. Here, the management server 11 compares a migration candidate time zone with the MTBF of the physical server, and excludes days (times) before and after a next failure occurrence predicted day (time) when the next failure occurrence predicted day (time) is included in the migration candidate time zone.

In addition, the management server 11 performs migration so as to copy the virtual server to the physical server that is a migration destination, and turns off the power of the physical server that has no operating virtual server on the basis of the migration result (S17). Here, the management server 11 determines whether or not the power of a physical server on which the virtual server that is a migration target is operated can be turned off, on the basis of a certain condition. The condition is that all virtual machines of the physical server are enabled to be migrated to another physical server, and that the physical server is not selected as a candidate of a migration destination server of the virtual machines.

In addition, the management server 11 performs migration of the virtual server and turns off the power of the physical server. Here, the management server 11 builds the virtual server that is a migration target on the physical server that is a migration destination by the server migration before a migration enable time. The management server 11 switches the physical server on which the virtual server that is a migration target is operated from the migration source physical server to the migration destination physical server at the migration enable time. The management server 11 turns off the power of the physical server that is a migration source.

The management server 11 calculates a difference in power consumption amounts before and after migration, and outputs information on a power consumption reduction amount after migration (S18). In S18, information on "operational consumption power of the physical server (at the time of a system usage rate 0%)", "operational consumption power of the service before migration in a migration time zone", "operational consumption power of the service after migration in the migration time zone", and "reduction enable consumption power due to migration" is used.

The management server 11 calculates operational consumption power of the service by combining operational consumption power of all operating physical servers on which the systems used for the service are operated. In addition, the management server 11 calculates consumption power that is reduced by migration by calculating a difference between "operational consumption power of the service before migration in the migration time zone" and "operational consumption power of the service after migration in the migration time zone".

The management server 11 outputs the following information, for example, in a certain format such as a comma separated values (CSV) file, as a power consumption reduction amount.

Figure 9:
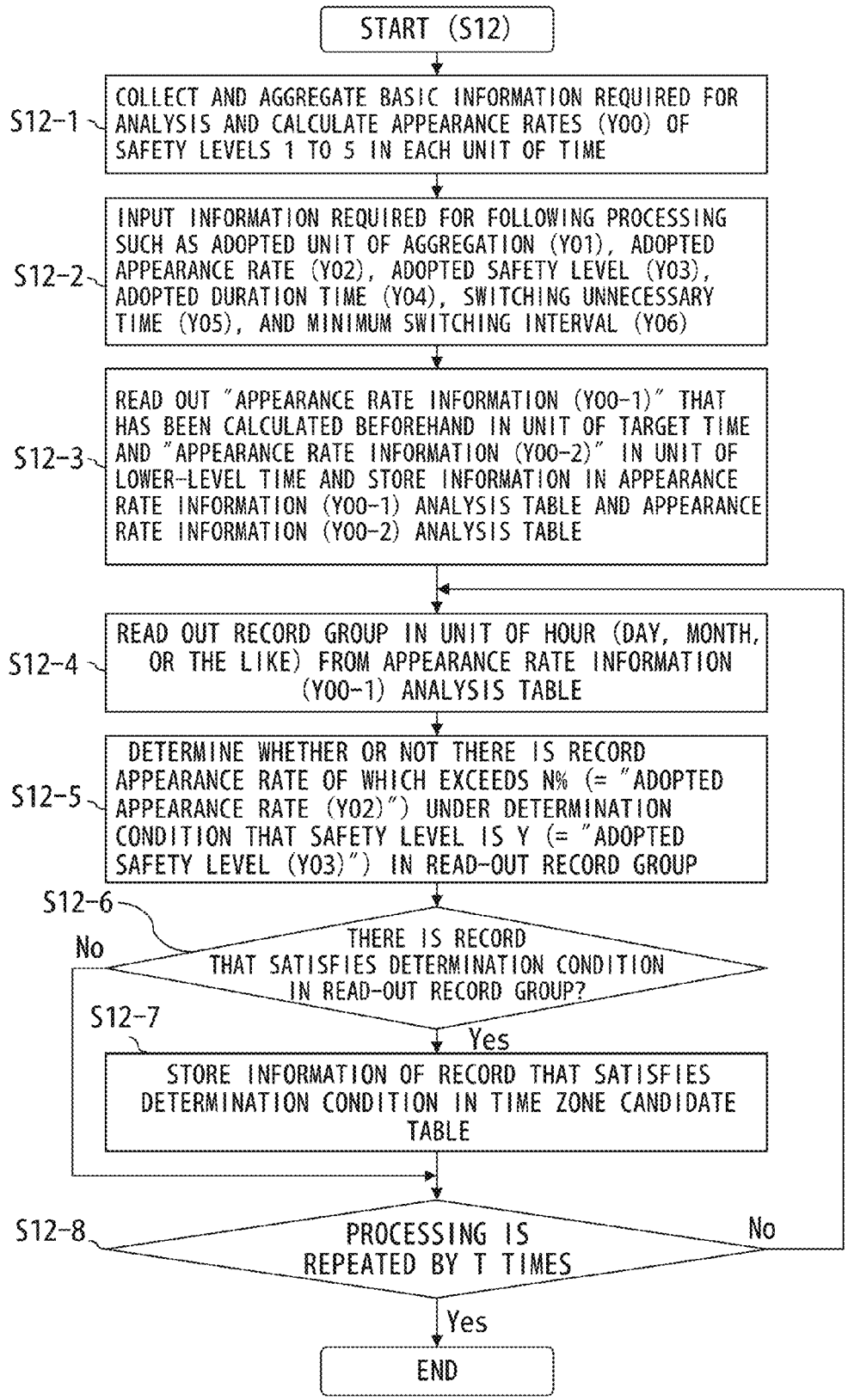
FIG. 9 illustrates an example of a flow of selection processing (S12) of a business service to be migrated in the embodiment.

Business service name of a migration target
Time zone of the migration target
System configuration before migration (physical server name and virtual server name)
Operational consumption power before migration
System configuration after migration (physical server name and virtual server name)
Operational consumption power after migration
Consumption power that is reduced by migration FIG. 9 illustrates an example of a flow of the selection processing (S12) of a business service to be migrated in the embodiment. The management server 11 obtains information required for analysis, and calculates appearance rates (Y00) of the safety levels 1 to 5 in the unit of time (S12-1). In the basic information required for analysis, the information that is input in S11 and stored in the storage device 29 and operation information of the business service are included. The information that is stored in the storage device 29 includes information on an average online response time of the business service. The operation information of the business service includes "time at which a request is input to the front server (for example, Web server)" and "time at which a response is output from the front server".

The management server 11 calculates an online response time from a difference between "time at which a request is input to the front server (for example, Web server)" and "time at which a response is output from the front server". The management server 11 calculates a ratio of the online response time to SLA on the basis of "(calculated online response time)/("average online response time" of the service management information 50)×100".

The management server 11 classifies the calculated ratio of the online response time to SLA into the safety levels 1 to 5 using the relationship table in FIG. 6. The relationship table in FIG. 6 is stored in the storage unit 29. The management server 11 aggregates the classified safety levels in "unit of hour", "unit of day", "unit of month", or "unit of quarter". Hereinafter, aggregation of the safety levels 1 to 5 in the certain unit of time by calculating a ratio of the online response time to SLA from the pieces of information A01 to A19 and classifying the calculated proportion into the safety levels 1 to 5 may be referred to as "aggregation of the operation information of the business service".

The management server 11 calculates an appearance rate of each of the aggregated safety levels in a unit of minimum "time" (may be referred to as analysis of the operation information of the business service). Here, the appearance rate of a safety level corresponds to a proportion of the number of appearance times of a safety level n in the total number of times by which the safety levels 1 to 5 appear in the unit of time. For example, it is assumed that the following safety levels appear during one hour of 14:00 to 15:00 in a certain day.

Safety level 1: three times
Safety level 2: two times
Safety level 3: zero times
Safety level 4: eight times
Safety level 5: two times
Total number of times of the safety levels 1 to 5: 15 times In this case, an appearance rate of each of the safety levels is as follows.

Safety level 1: 3/15=20%
Safety level 2: 2/15≅13%
Safety level 3: 0/15=0%
Safety level 4: 8/15≅53%
Safety level 5: 2/15≅13%

In addition, an appearance rate of a safety level of the service in the unit of day/month/quarter is calculated by the following method. Here, the appearance rate in the unit of day/month/quarter corresponds to an average value of appearance rates in a unit that is a lower level of the target unit. For example, in the case of the 4th of a certain month in the unit of day, an appearance rate of a safety level n of the 4th of the month corresponds to an average value of appearance rates of the safety level n in the unit of time that is a lower-level of the 4th of the month (=(total average value)/24 hours).

However, in a case where an average value of appearance rates of the safety level is obtained, for example, when an appearance rate of the safety level 1 corresponds to 100% in most of a time during 10:00 to 16:00 (day time) of the 4th of the month, and the other time corresponds to 0%, an average value of the appearance rates of the safety level 1 is as follows.

The average value of the appearance rates of the
safety level 1=(100%+100%+100%+100%+
100%+100%)/24 hours=25%

At that time, in a case where it is assumed that an appearance rate of a condition of a selection target is 80%, although 100% of the appearance rate of the safety level 1 continues in the day time of the 4th of the month, but the service is not treated as the selection target. As described above, when there is a large gap between appearance rates in one day, the service is determined as a correction target in exception processing (S13) that is described later.

After that, the administrator uses the terminal 20 to input input information such as an adopted unit of aggregation (Y01), an adopted appearance rate (Y02), an adopted safety level (Y03), an adopted duration time (Y04), a switching unnecessary time (Y05), and a minimum switching interval (Y06), to the management server 11 (S12-2).

The adopted unit of aggregation (Y01) corresponds to information on a unit of time (day/month/quarter) that is adopted when aggregation and analysis of the operation information of the business service are performed. In the aggregation/analysis of the operation information of the business service in the unit of time, adopted of the unit of day, unit of month, unit of year, or unit of half period is different depending on the nature of the business service. For example, "unit of day" is input for a business in which routine work is performed every day. In addition, "unit of month" is input for a business in which a busy period is different depending on weekday or holiday. In addition, "unit of year" is input for a business in which a busy period is different depending on month.

The adopted appearance rate (Y02) corresponds to a value (%) of an appearance rate that is adopted when aggregation and analysis of the operation information of the business service are performed.

The adopted safety level (Y03) corresponds to a value of the safety level (integer of 1 to 5) that is adopted when aggregation and analysis of the operation information of the business service are performed.

A service level value at the time of aggregation is arbitrary ensured by three values of the adopted unit of aggregation (Y01), the adopted appearance rate (Y02), and the adopted safety level (Y03). For example, when "adopted unit of aggregation: day", "adopted appearance rate: 80%", and "adopted safety level: 1" are satisfied, the service of the operation information of the appearance rate 80% or more of the safety level 1 on which aggregation/analysis is performed in the unit of day is determined as a selection target (*1).

The adopted duration time (Y04) corresponds to information that is used to determine the operation information that is not treated as the selection target as a correction target in the exception processing as described above, and to the adopted duration time (Y04), a time in which an operation time of a physical server or a virtual server elapses (duration time) is set. The adopted duration time (Y04) is used to correct a target that is not treated as an aggregation target when there is a large gap of appearance rates of the safety level in one day. For example, when "adopted duration time: four hours" is satisfied, the average value of appearance rates of the safety level 1 in 4th of the month is 25% in the above-described example, so that the service is outside of the selection target in the above-described condition (*1). However, when the adopted duration time (Y04) is used, the appearance rate of the safety level 1 is 80% or more for consecutive four hours or more, so that the service can be selected.

The switching unnecessary time (Y05) is used to specify a time in which the aggregation/analysis cannot be performed because the aggregation/analysis just cannot be performed in a target time due to the nature of the business even when a candidate time of a selection target is determined.

The minimum switching interval (Y06) is specified when the aggregation/analysis is performed in a case where there is a time of the minimum switching interval or more. For example, there is a case where the aggregation/analysis or the like every one hour becomes wasted aggregation from a viewpoint of power consumption. Therefore, the aggregation/analysis is performed using the minimum switching interval (Y06) when there is the time of the minimum switching interval or more. The minimum switching interval (Y06) is used for the exception processing in S13.

After that, the management server 11 obtains "appearance rate information (Y00-1)" in the unit of time that corresponds to "adopted unit of aggregation (Y01)" and "appearance rate information (Y00-2)" in the unit of lower-level time, out of the appearance rates of the safety level of the service on which the aggregation/analysis has been performed in S12-1. The management server 11 stores "appearance rate information (Y00-1)" in an appearance rate information (Y00-1) analysis table, and stores "appearance rate information (Y00-2)" in an appearance rate information (Y00-2) analysis table (S12-3). The appearance rate information (Y00-1) analysis table and the appearance rate information (Y00-2) analysis table are described using FIG. 10.

FIG. 10 illustrates a data structure example of the appearance rate information (Y00-1) analysis table or the appearance rate information (Y00-2) analysis table in the embodiment. An appearance rate information (Y00-1) analysis table 60 and an appearance rate information (Y00-2) analysis table 70 are stored in the storage unit 29. Each of the appearance rate information (Y00-1) analysis table 60 and the appearance rate information (Y00-2) analysis table 70 is a work table that includes data items of "hour (day, month, or the like)", "service name", "safety level", "appearance rate". In "hour (day, month, or the like)", "hour", "day", "month", or the like that corresponds to the adopted unit of aggregation is stored. In "service name", a service name is stored. In "safety level", a safety level of the service that corresponds to "hour (day, month, or the like)" is stored. In "appearance rate", an appearance rate of "safety level" that corresponds to "hour (day, month, or the like)" is stored.

Returning to FIG. 9, the management server 11 reads out a record group from the appearance rate information (Y00-1) analysis table in the unit of hour (day, month, or the like). For example, in FIG. 11, five records (safety levels 1 to 5) in a time zone of "14:00 to 14:59" are read out as one record group (S12-4).

The management server 11 determines whether or not there is a record the appearance rate of which exceeds n % (="adopted appearance rate (Y02)") under a determination condition that the safety level is y (="adopted safety level (Y03)") in the read-out record group (S12-5).

When there is the record that satisfies the determination condition ("Yes" in S12-6), as illustrated in FIG. 11, the management server 11 stores a service name and a time zone that are included in the record in the time zone candidate table (S12-7).

FIG. 11 illustrates an example of a time zone candidate table in the embodiment. A time zone candidate table 80 includes data items of "service name" and "time zone candidate". In "service name", the name of a service, which is used to identify a service is stored. In "time zone candidate", a candidate of a time zone that corresponds to the service is stored.

The management server 11 repeats the processing of S12-4 to S12-7 by T times (S12-8). Here, "T" is a value that depends on the adopted unit of aggregation, and for example, when the adopted unit of aggregation corresponds to "year", "T=12" is obtained, and when the adopted unit of aggregation corresponds to "month", "T=28 (29), 30, or 31" is obtained, and when the adopted unit of aggregation corresponds to "day", "T=24" is obtained.

As described above, by creating a time zone candidate table of the business service, the business service is selected as a migration candidate.

After that, the exclusion processing of the first case where there is no power consumption effect (S13) is described with reference to FIGS. 12 to 14.

Figure 12:
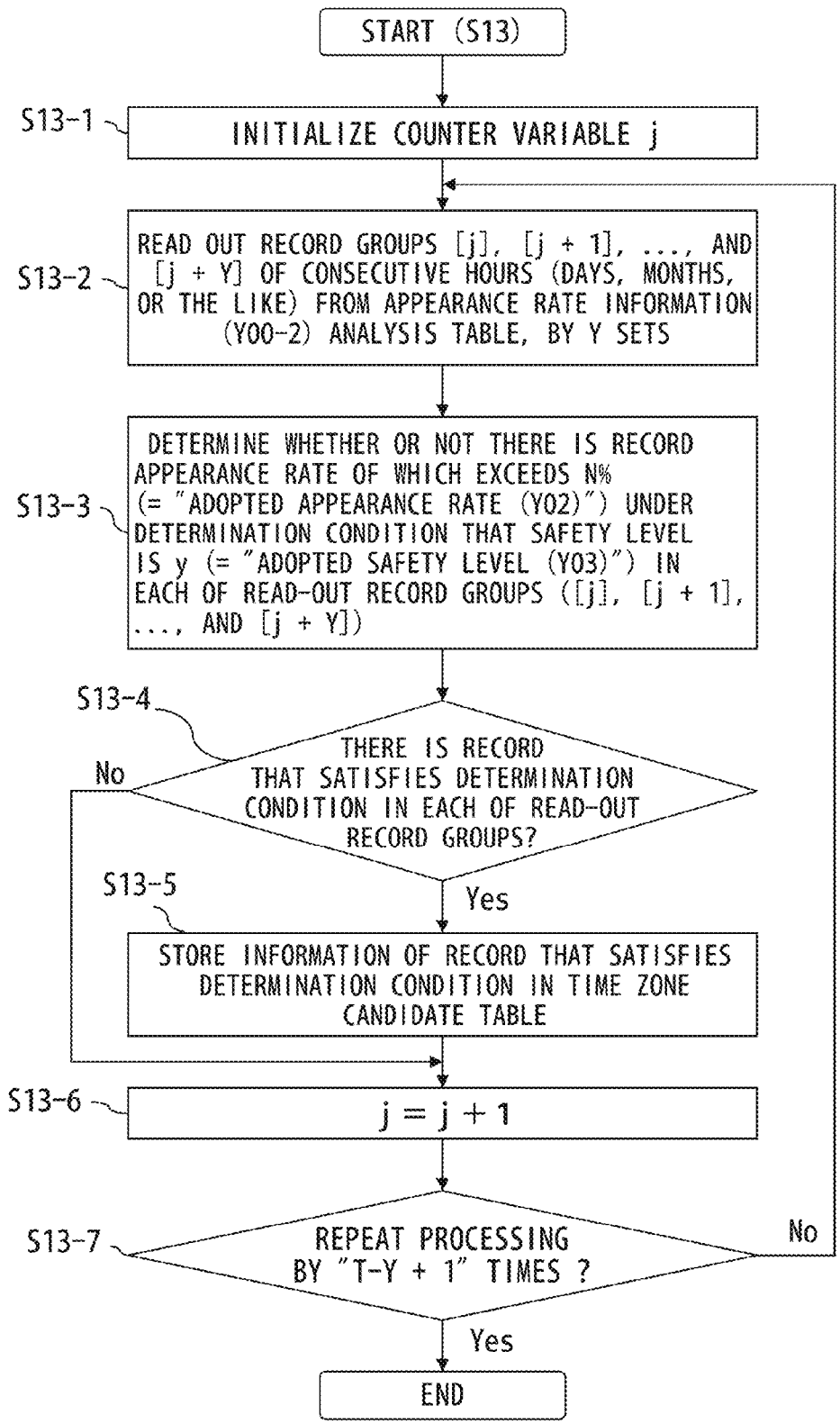
FIG. 12 illustrates an example of a flow of first exclusion processing in a case where there is no power consumption effect (exception processing depending on an aggregation time interval) (S13) in the embodiment.

FIG. 12 illustrates an example of a flow of the exclusion processing of the first case where there is no power consumption effect (exception processing depending on an aggregation time interval) in the embodiment (S13). FIG. 13 is a diagram illustrating reading-out of record groups [j], [j+1], . . . , and [j+Y] of consecutive hours, from the appearance rate information (Y00-2) analysis table in the embodiment.

In the flow, the management server 11 analyzes whether or not there is a time zone in which an operating state of the physical server or the virtual server elapses for Y hours (=adopted duration time (Y04) or more) for the appearance rate information (Y00-2) analysis table 70.

First, the management server 11 initializes a counter variable j by 1 (S13-1). As illustrated in FIG. 13, the management server 11 reads out the record groups [j], [j+1], . . . , and [j+Y] of consecutive hours (days, months, or the like) from the appearance rate information (Y00-2) analysis table 70 (S13-2).

The management server 11 determines whether or not there is a record the appearance rate of which exceeds n % (="adopted appearance rate (Y02)") under the determination condition that the safety level is y (="adopted safety level (Y03)") in the read-out record groups ([j], [j+1], . . . , and [j+Y]) (S13-3).

When there is the record that satisfies the determination condition in the read-out record groups ("Yes" in S13-4), as illustrated in FIG. 11, the management server 11 stores a service name and a time zone that are included in the record, in the time zone candidate table (S13-5). At that time, when the same service name and time zone have been already stored in the time zone candidate table, the management server 11 does not store the service name and the time zone.

The management server performs increment of the counter variable j (S13-6).

The management server 11 repeats the processing of S13-2 to S13-6 by "T−Y+1" times (S13-7). "T" is a value that is depends on the adopted unit of aggregation, and for example, when the adopted unit of aggregation corresponds to "year", "T=12" is obtained, and when the adopted unit of aggregation corresponds to "month", "T=28(29), 30, or 31" is obtained, and when the adopted unit of aggregation corresponds to "day", "T=24" is obtained.

Figure 14:
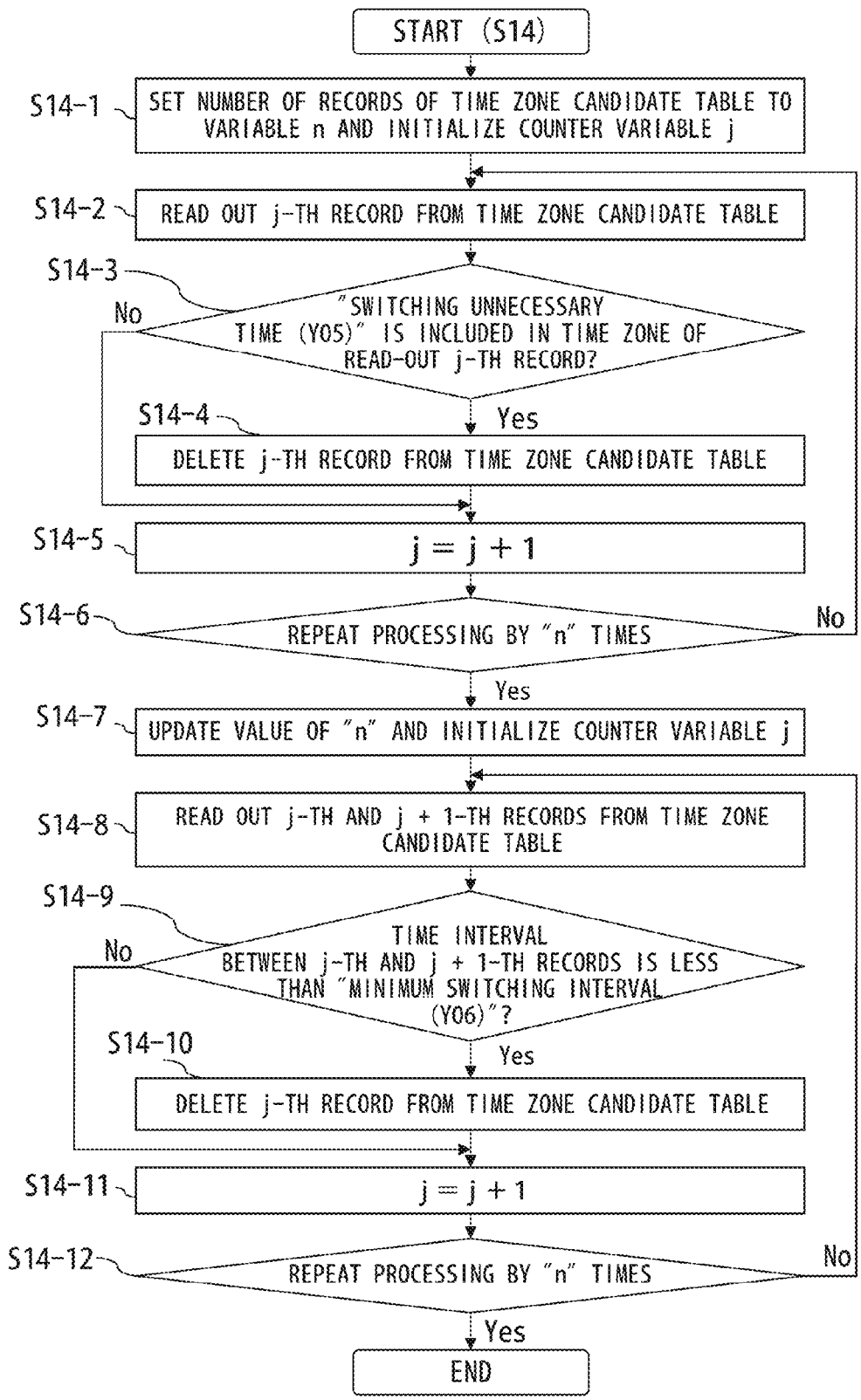
FIG. 14 illustrates an example of a flow of exclusion processing in the case where there is no power consumption effect (scheme in which frequent migration is prevented from a viewpoint of power consumption) (S14) in the embodiment.

FIG. 14 illustrates an example of a flow of the exclusion processing of the case where there is no power consumption effect (scheme of preventing frequent migration from a viewpoint of power consumption) (S14) in the embodiment. As described above, in S12, there is a case where migration in the unit of one hour or a time zone of peak of power consumption is determined as a candidate. In the migration in the unit of one hour, when the migration time is considered, intended power consumption reduction may not be obtained. In addition, it is desirable that the migration in the time zone of peak of power consumption is avoided. By considering such a case, "switching unnecessary time (Y05)" and "minimum switching interval (Y06)" are set beforehand, and a time zone that is included in the time range is excluded from the candidate of the time zone in which the migration is performed.

First, the management server 11 sets the number of records in the time zone candidate table 80 to the variable n. In addition, the management server 11 initializes the counter variable j by 1 (S14-1).

The management server 11 reads out the j-th record from the time zone candidate table 80 (S14-2). The management server 11 determines whether or not "switching unnecessary time (Y05)" is included in "time zone" of the read-out j-th record (S14-3).

When "switching unnecessary time (Y05)" is included in "time zone" of the read-out j-th record ("Yes" in S14-3), the management server 11 deletes the j-th record from the time zone candidate table 80 (S14-4). The management server 11 performs increment of the counter variable j (S14-5).

The management server 11 repeats the processing of S14-2 to S14-5 by "n" times (S14-6).

After that, the management server 11 counts the current number of records in the time zone candidate table 80, and updates a value of "n" by the count number. In addition, the management server 11 initializes the counter variable j by 1 (S14-7).

The management server 11 reads out the j-th and the j+1-th records from the time zone candidate table 80 (S14-8). The management server 11 determines whether or not a time interval between the j-th and the j+1-th records is less than "minimum switching interval (Y06)" (S14-9).

When the time interval between the j-th and the j+1-th record is less than "minimum switching interval (Y06)" ("Yes" in S14-9), the management server 11 deletes the j-th record from the time zone candidate table 80 (S14-10). The management server 11 performs increment of the counter variable j (S14-11).

The management server 11 repeats the processing of S14-8 to S14-11 by "n" times (S14-12).

Next, selection processing (S15) of a virtual server to be migrated and a physical server that is a migration destination is described with reference to FIGS. 15A-15C.

Figure 15A:
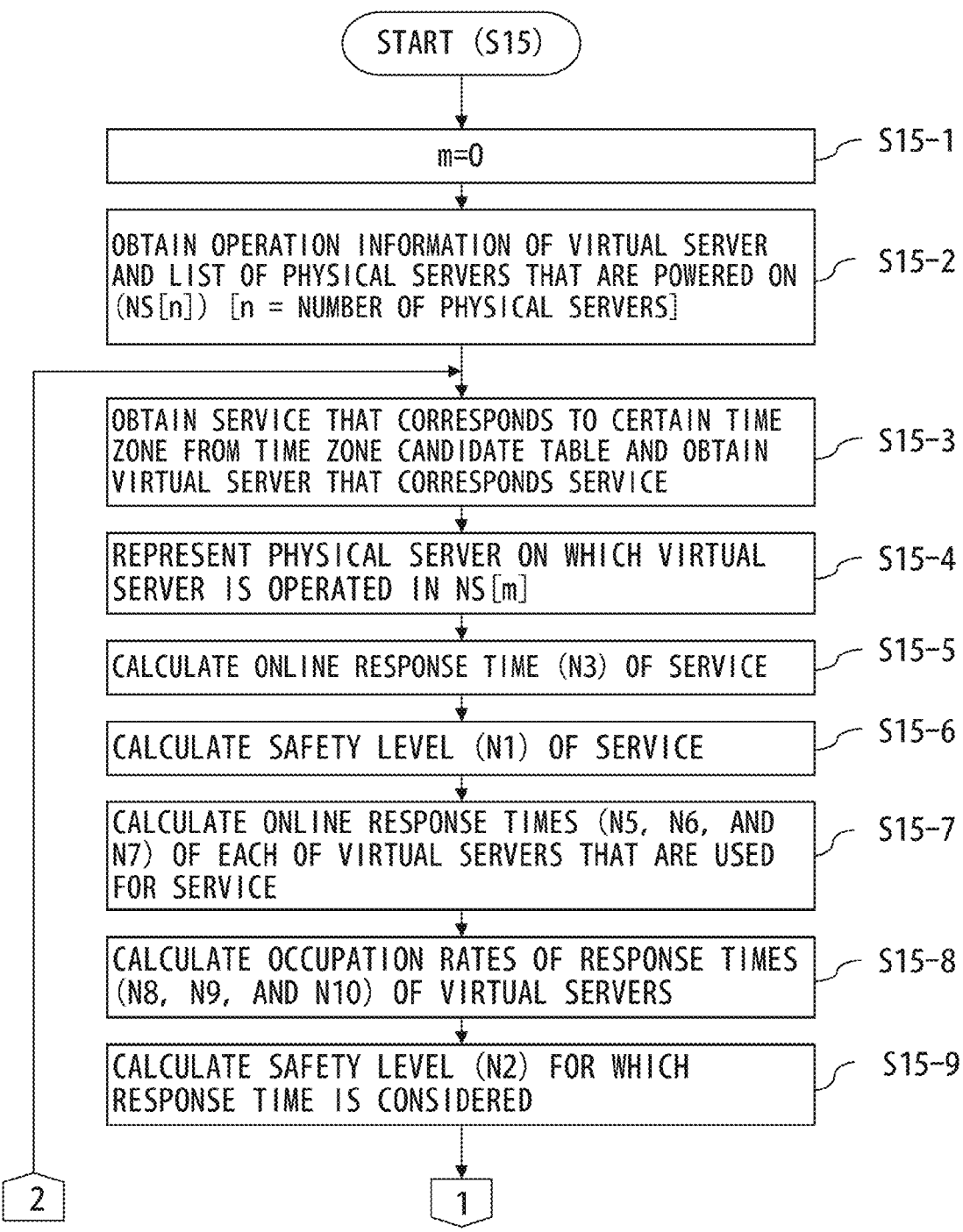

FIGS. 15A-15C illustrate an example of a flow of the selection processing (S15) of a virtual server to be migrated and a physical server that is a migration destination in the embodiment. The flow of FIGS. 15A-15C is executed in the unit of business service.

The management server 11 initializes a counter variable m by 0 (S15-1). The management server 11 obtains the operation information 56 of the virtual server and a list of physical servers which are on (NS[n]) through the collection unit 22 (S15-2). Here, "n" corresponds to the number of physical servers which are power on. Therefore, a list of all physical servers which are power on (NS[0] to NS[n−1]) is obtained.

The management server 11 obtains a service that corresponds to a certain time zone from the time zone candidate table 80. The management server 11 obtains the name of a virtual server that performs the service from the service management information 50 (S15-3). Here, a physical server on which the virtual server is operated is represented in NS[m] (S15-4).

The management server 11 calculates an online response time (N3) of the service that is obtained in S15-3, from the obtained operation information 56 of the virtual server using the following formula (S15-5).

The online response time $N3=(A10)-(A01)$

After that, the management server 11 calculates a safety level (N1) of the obtained service (S15-6). Here, an online response time (ratio of an online response time to SLA) is indicated by the following formula.

The online response time(ratio of an online response time to SLA)=$N3$(online response time)/SLA response time Therefore, the management server 11 calculates a safety level of the service from the calculated online response time using the safety level table 55. For example, "online response time (N3)=7 seconds" and "SLA response time=10 seconds" are satisfied, "online response time (ratio of an online response time to SLA)=7/10=70%" is obtained. In this case, "safety level of the service=4" is obtained from FIG. 6.

The management server 11 calculates online response times (N5, N6, and N7) of virtual servers that are used for the service using the operation information 56 (A01 to A19) of the virtual server, which is obtained by the collection unit 22 (S15-7). Here, the management server 11 calculates processing performance information of each of the virtual servers for one service request (online response time) using the following formula.

The processing time $N5$ of the front server=$((A02)-(A01))+((A10)-(A09))$

The processing time $N6$ of the APL server=$((A04)-(A03))+((A08)-(A07))$

The processing time $N7$ of the DB server=$((A06)-(A05))$

The management server 11 calculates an occupation proportion of a processing time of each of the virtual servers in the online response time using the following formula (S15-8).

The processing time occupation proportion $N8$ of the front server=$N5/N3$

The processing time occupation proportion $N9$ of the APL server=$N6/N3$

The processing time occupation proportion $N10$ of the DB server=$N7/N3$

The management server 11 uses the following formula to calculate a safety level (N2) for which a response time is considered (S15-9).

The safety level ($N2$) for which a response time is considered=safety level×the occupation proportion in the response time For example, when "occupation proportion in a response time N8=0.1, and "N9=0.5", and "N10=0.4" are satisfied in a case where "safety level N1=2" is satisfied, the safety levels (N2) for which response times of the WEB server, the APL server, and the DB server are considered are calculated as indicated below.

$N2(WEB)=N1 \times N8=2 \times 0.1=0.2$ $N2(APL)=N1 \times N9=2 \times 0.5=1.0$ $N2(DB)=N1 \times N10=2 \times 0.4=0.8$ The management server 11 initializes a counter variable i by 0 (S15-10). The management server 11 determines whether or not the variable m and the variable are the same value (S15-11). When the variable m and the variable i are the same value ("Yes" in S13-11), the flow proceeds to processing of S15-20.

When the variable m and the variable i are not the same value ("No" in S15-11), the management server 11 executes next processing. That is, the management server 11 obtains a ratio (N11) of the number of CPU clocks between the physical server NS[m] and the physical server NS[i] that is a comparison target using the physical server management information 30 (S15-12).

$N11$=number of CPU clocks(physical server NS[$m$])/
    number of CPU clocks(physical server NS[$i$]
    that is a comparison target)

After that, the management server 11 obtains a safety level (N4) of the service when the virtual server is migrated (S15-13). First, the management server 11 calculates a safety level (N12) after migration of the virtual server that is a migration target using the following formula.

$N12=N2 \times N11$

For example, when the virtual server to be migrated is the WEB server, "N12(WEB)=N2(WEB)×N11" is calculated. When the virtual server to be migrated is the APL server, "N12(APL)=N2(APL)×N11" is calculated. When the virtual server to be migrated is the DB server, "N12(DB)=N2(DB)×N11" is calculated.

After that, the management server 11 uses the safety level (N12) after migration of the virtual server that is a migration target to calculate a safety level (N4) of the service after migration on the basis of the following formula.

The safety level ($N4$) of the service=the safety level
    of the Web server+the safety level of the APL
    server+the safety level of the DB server This flow is processed in the unit of service. Therefore, when all virtual servers that execute a service that is a current processing target operates on the physical server NS[m], all of the virtual servers that execute the service become migration targets. In this case, the safety level (N4) of the service after migration is as follows.

The safety level ($N4$) of the service=the safety level
    ($N12$) of the WEB server+the safety level ($N12$)
    of the APL server+the safety level ($N12$) of the
    DB server.

In addition, it is assumed that apart of the virtual servers that execute the service that is the current processing target operates on the physical server NS[m], and the remaining virtual servers operates on another physical server. In this case, for the physical server NS[m], only the part of virtual servers are migration targets, and the remaining virtual server are not migration targets. In this case, the safety level (N12) after migration is used to calculate the safety level (N4) of the service after migration for the virtual server that is the migration target, and the safety level (N4) of the service after migration is calculated for the virtual server that is not a migration target using the current safety level (N2). For example, when the WEB server is only migrated, "N4=N12(WEB)+N2(APL)+N2(DB)" is calculated. When the APL server is only migrated, "N4=N2(WEB)+N12(APL)+N2(DB)" is calculated. When the DB server is only migrated, "N4=N2(WEB)+N2(APL)+N12(DB)" is calculated. When the WEB server and the APL server are migrated, "N4=N12(WEB)+N12(APL)+N2(DB)" is calculated.

In addition, when each of the plurality of virtual servers that execute the service that is the current processing target are migrated to different physical servers, the same method as the above-described method may be employed. That is, it is assumed that, in each of the plurality of virtual servers, only the virtual server is a migration target (noted virtual server), and the remaining virtual servers are not the migration targets, and the same calculation method as the above-described method may be employed for each of the noted virtual servers.

After that, the management server 11 registers information that is used to determine whether the virtual server that executes the service that is the current processing target on the physical server NS[m] is enabled to be migrated to the physical server NS[i] that is a comparison target, to the migration availability server list (S15-14). The above-described processing is described below using FIG. 16.

FIG. 16 illustrates an example of a migration availability server list in the embodiment. A migration availability server list 90 is stored in the storage unit 29. The migration availability server list 90 includes items of "day", "service", "physical server that is a migration source (power-off candidate)", "VM", and "physical server that is a migration destination". In addition, the list includes items of "service safety level (N4) after migration", "CPU usage rate (%) of a physical server that is a migration destination", "memory usage rate (%) of a physical server that is a migration destination", "busy rate (%) of a disk of a physical server that is a migration destination", and "migration availability".

Here, "day" indicates a day in which a service is performed. In addition, "service" indicates a name that is used to identify a service. In addition, "physical server that is a migration source (power-off candidate)" indicates a physical server that is indicated by the physical server NS[m], that is, a physical server that is a migration source. In addition, "VM" indicates information that is used to identify a virtual server (virtual machine: VM) that operates in the physical server. In addition, "physical server that is a migration destination" indicates information that is used to identify a physical server that is indicated by the physical server NS[i] that is a comparison target. In "service safety level (N4) after migration, the service safety level (N4) after migration is stored. In "CPU usage rate (%) of a physical server that is a migration destination", the CPU usage rate (%) of a physical server that is a migration destination is stored. In "memory usage rate (%) of a physical server that is a migration destination", a memory usage rate (%) of a physical server that is a migration destination is stored. In "busy rate (%) of a disk of a physical server that is a migration destination", a busy rate (%) of a disk of a physical server that is a migration destination is stored. In "migration availability", a result that is obtained by determining whether or not the virtual server of the physical server NS[m] is enabled to be migrated to the physical server NS[i] that is a comparison target is stored.

In S15-14, the management server 11 registers "day", "service", "physical server that is a migration source (power-off candidate)", "VM", "physical server that is a migration destination", and "service safety level (N4) after migration", to the migration availability server list 90. In addition, the management server obtains "CPU usage rate", "memory usage rate", and "busy rate of a disk" of the physical server NS[i] that is a comparison target from the physical server management information 30, and registers the information to the migration availability server list 90. It is noted that registration of "migration availability" is performed in S15-20.

After that, the management server 11 uses the migration availability server list 90 to determine, for example, the physical server NS[i] that is a comparison target, which satisfies all of the following four conditions, to be a migration destination physical server candidate (S15-15 to S15-19).

The service safety level (N4) after migration<T1 (S15-15)

The CPU usage rate of the physical server NS[i] that is a comparison target<T2% (S15-16)

The memory usage amount of the physical server NS[i] that is a comparison target<T3% (S15-17)

The busy rate of a disk of the physical server NS[i] that is a comparison target<T4% (S15-18)

Here, T1, T2, T3, and T4 are threshold values, certain integers are set to T1, T2, T3, and T4, respectively. For example, to T3, "3" is set. For example, to T2 to T4, a usage rate of a resource of the server, for example, 70 is set.

The management server 11 performs registration of migration availability to the migration availability server list 90 (S15-20). The management server 11 registers "○" to "migration availability" of the migration availability server list 90 when all of the above-described four conditions are satisfied, and registers "x" to "migration availability" of the migration availability server list 90 when not all of the above-described four conditions are satisfied. In the example of FIG. 16, it is understood that, for a service A, a virtual server APL-1 of a physical server NS08 is enabled to be migrated to a physical server NS04. In addition, it is understood that a virtual server APL-3 of a physical server NS10 is enabled to be migrated to a physical server NS03.

After that, the management server 11 determines whether or not the variable i is smaller than the number of physical servers n the power of which is turned on (S15-21). When the variable i is smaller than the number of physical servers n the power of which is turned on ("Yes" in S15-21), the management server 11 performs increment of the variable i (S15-22), and the flow returns to the processing of S15-11. When the variable i is equal to or larger than the number of physical servers n the power of which is turned on ("No" in S15-21), the management server 11 determines whether or not the variable m is smaller than the number of physical servers n the power of which is turned on (S15-23).

When the variable m is smaller than the number of physical servers n the power of which is turned on ("Yes" in S15-23), the management server 11 performs increment of the variable m (S15-24), and the flow returns to the processing of S15-3. When the variable m is equal to or larger than the number of physical servers n the power of which is turned on ("No" in S15-23), the flow ends.

FIG. 17 illustrates an example of a flow of exclusion processing of the case where there is no power consumption effect (availability verification of a physical server candidate that is a migration destination) in the embodiment (S16). The management server 11 initializes the counter variable by 0 (S16-1).

The management server 11 extracts incident information that corresponds to a physical server [i] in "occurrence source" and "system termination" in an incident category, from an incident management table 100 illustrated in FIGS. 18A and 18B (S16-2).

The management server 11 calculates MTBF (meantime between failures) using the extracted incident information (S16-3). The calculation of the MTBF is described with reference to FIGS. 18A and 18B.

FIGS. 18A and 18B illustrate an example of an incident management table in the embodiment. The incident management table 100 is a table that is used to manage an occurred incident as incident information, and is stored in the storage unit 29. The incident management table 100 includes "incident number", "segment", "category 1", "occurrence source", "occurrence day", "MTBF", "request source", . . . , "content", and "solution day".

Here, "incident number" is a number that is used to identify incident information. In addition, "segment" is an item that is used to distinguish "failure", "Q&A", "work request", and the like. In addition, "category 1" indicates a category such as "system termination", "operation procedure", and the like. In addition, "occurrence source" indicates an occurrence source of the incident. In addition, "occurrence day" indicates an occurrence day of the incident. In addition, "MTBF" indicates an interval after an incident of the system has previously occurred. In addition, "content" indicates a content of the incident. In addition, "solution day" indicated a day in which the incident is solved.

The management server 11 extracts incident information of "system termination" in a unit of "occurrence source" from the incident management table 100. For example, when the occurrence source is "server A", pieces of incident information of occurrence days "2011/1/23", "2011/3/15", "2011/5/15", "2011/7/31", and "2011/9/20" are extracted. Intervals of occurrence days of the extracted incident information are 51 days, 61 days, 77 days, and 51 days, so that "MTBF=(51+61+77+51)/4=60 days" is obtained. The time period of 60 days is a time period during which a probability that a failure occurs after a day in which a system failure has previously occurred is low.

After that, the management server 11 creates a migration enable time period calendar using calendar information, a day in which a system failure has previously occurred, a safety time period even when the system terminates, the calculated MTBF (S16-4). The migration enable time period calendar is described with reference to FIG. 19.

Figure 19:
FIG. 19 illustrates an example of a migration enable time period calendar in the embodiment.

FIG. 19 illustrates an example of the migration enable time period calendar in the embodiment. A migration enable time period calendar 110 corresponds to information that is used to manage an occurrence day of the incident and a migration enable time period on the calendar for each of the physical servers. The management server 11 adds the safety time period even the system (physical server [i]) terminates to the day in which a system failure has previously occurred, and as illustrated in FIG. 19, the addition is reflected to the migration enable time period calendar. Here, the last day of the safety time period even when the system (physical server [i]) terminates is obtained by the following formula.

The last day of the safety time period even when the system terminates=the day in which a system failure has previously occurred+(MTBF−10 days)−1 day=2011/9/20+(60−10)−1=2011/11/8

Therefore, during 2011/9/20 to 2011/11/9, it is determined that a probability that a termination failure of the physical server [i] does not occur is high. As illustrated in FIG. 19, the management server 11 reflects a time period from an incident occurrence day of the latest server termination to the MTBF (safety index is obtained by minus 10 days) in the migration enable time period calendar as "migration safety time period".

After that, the management server 11 performs matching between a day of the migration enable time period calendar 110 and a day of a record of the physical server [i] in which "○" is set to "migration availability" in the migration availability server list 90. The management server 11 creates a server operation schedule calendar on the basis of the matched day (S16-5). The server operation schedule calendar is used to determine actual operation/termination of a physical server. The server operation schedule calendar is described with reference to FIG. 20.

FIG. 20 illustrates an example of the server operation schedule calendar in the embodiment. A server operation schedule calendar 120 is a calendar in which a migration enable flag "1" is set to a day that corresponds to the day of the record of the physical server [i] in which "o" is set to "migration availability" of the migration availability server list 90, in the migration enable time period calendar 110. Here, "migration enable time period" of the server operation schedule calendar 120 indicates a time period during which it is determined that a probability that termination failure of the physical server [i] does not occur is high.

Using the server operation schedule calendar 120, it can be determined that a time period during which "migration enable time period" and the migration enable flag "1" are overlapped with each other is a time period during which a virtual server can be actually migrated and the power of a physical server that is a migration source can be turned off.

After the processing in S16-5, the management server 11 performs increment of the counter variable i (S16-6). For all of the physical servers, the processing of S16-2 to S16-6 is repeated (S16-7).

After that, migration of a virtual server and power-off of a physical server are described using FIGS. 21 and 22.

Figure 21B:
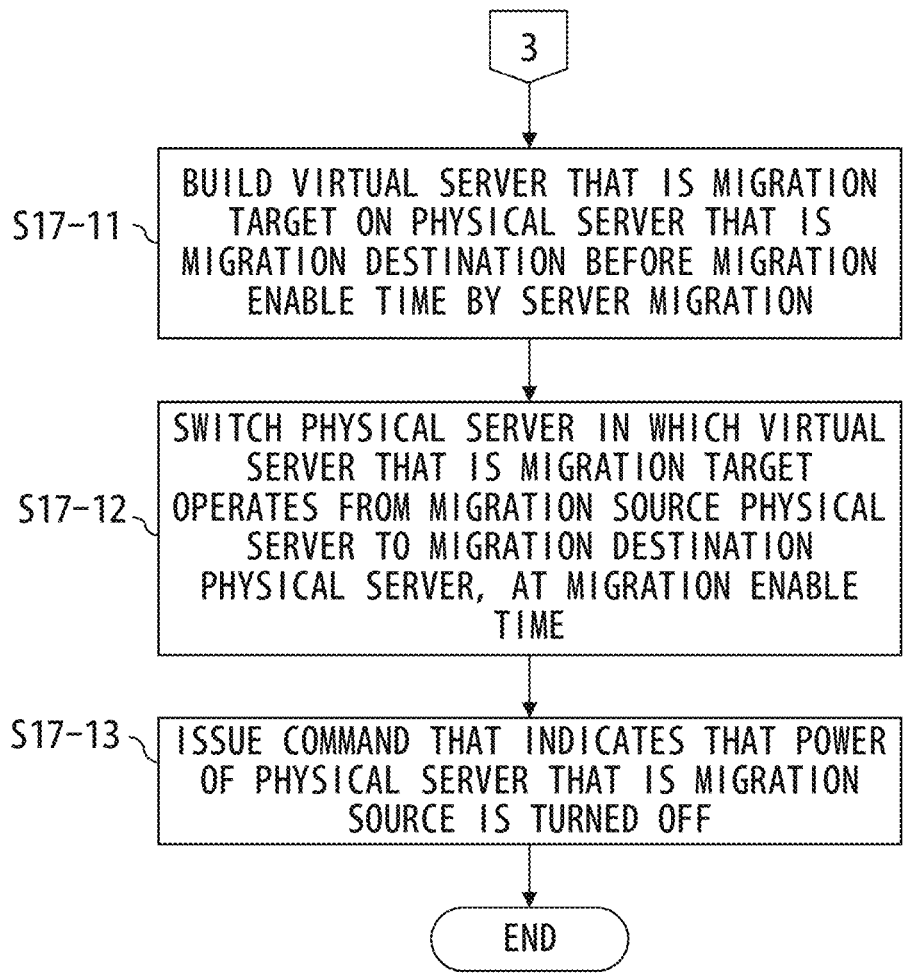

FIGS. 21A and 21B illustrate an example of a flow of the migration of a virtual server and the power-off processing a physical server (S17) in the embodiment. The management server 11 obtains a list of all of the physical servers which are on (NS[n]) (S17-1). Here, "n=the number of all physical servers the power of which is turned on" is satisfied. Therefore, a list that includes NS[1] to NS[n] as elements is obtained.

The management server 11 initializes the counter variable i by 0 (S17-2). The management server 11 performs increment of the counter variable i (S17-3). The management server 11 obtains a list of all virtual servers that operate on the physical server NS[i] (NVM[m]) (S17-4). Here, "m=the number of all virtual servers that operate on the physical server NS[i]" is satisfied. Therefore, a list that includes the NVM[1] to NVM[m] that operate on the physical server NS[i] as elements is obtained.

The management server 11 obtains a schedule of the physical server NS[i] to which a migration enable flag is set, from the server operation schedule calendar 120 (S17-5). The management server 11 obtains a record of the physical server NS[i] in a day that corresponds to the obtained schedule, from the migration availability server list 90 (S17-6).

The management server 11 uses the record that is obtained in S17-6 to determine whether or not all of the virtual servers (NVM[1] to NVM[m]) that operate on the physical server NS[i] can be migrated to another physical server (S17-7). The processing of S17-7 is described with reference to FIG. 22. When not all of the virtual servers (NVM[1] to NVM[m]) that operate on the physical server NS[i] can be migrated to another physical server ("No" in S17-7), the flow proceeds to processing of S17-10.

When all of the virtual servers (NVM[1] to NVM[m]) that operate on the physical server NS[i] can be migrated to another physical server ("Yes" in S17-7), the management server 11 executes next processing. That is, the management server 11 determines whether or not the physical server NS[i] is not a migration destination candidate using the record that is obtained in S17-6 (S17-8). The processing of S17-8 is described with reference to FIG. 22. When the physical server NS[i] is a migration destination candidate ("No" in S17-8), the flow proceeds to processing of S17-10.

Using the migration availability server list 90, when the physical server NS[i] is not a migration destination candidate ("Yes" in S17-8), the management server 11 determines the physical server NS[i] to be a candidate of a physical server the power of which is turned off. The management server 11 stores information on the physical server NS[i] that is determined to be the candidate of a physical server the power of which is turned off in the migration/power-OFF candidate table (S17-9).

The processing of S17-3 to S17-9 is repeated by the number of elements n that are included in the list of all of the physical servers which are on (NS[n]) (S17-10).

FIG. 22 is a diagram illustrating the processing of S17-7 to S17-9. FIG. 23 illustrates an example of a migration/power-OFF candidate table in the embodiment. A list in FIG. 22 is the migration availability server list 90. For example, in December 1st, all of VMs in the physical server NS08 can be migrated to another physical server, and the physical server NS08 is not a candidate of a migration destination of the VMs. In this case, the management server 11 extracts information on the physical server NS08 from the migration availability server list 90, and stores the information in a migration/power-OFF candidate table 130. In the migration/power-OFF candidate table 130, "day", "service", "physical server power-off candidate before migration", "VM", "migration destination" of the migration availability server list 90 are stored.

In a physical server NS09, virtual servers "APL-2" and "DB-1" cannot be migrated, that is, not all the virtual servers can be migrated, so that the power cannot be turned OFF.

The physical server NS09 is a migration destination of the virtual server APL-1 of the physical server NS08, so that the power cannot be turned OFF.

Returning to FIGS. 21A and 21B, the management server 11 executes next processing before the migration enable time. That is, the management server 11 obtains the name of a virtual server that is a migration target, the name of a physical server on which the virtual server is operated, and the name of a physical server that is a migration destination candidate, from the migration/power-OFF candidate table 130. Using the obtained information, the management server obtains a virtual server from the physical server that is a migration source and builds the virtual server on a physical server that is a migration destination by server migration (S17-11).

The management server 11 switches the physical server on which the virtual server that is a migration target is operated, from a migration source physical server to a migration destination physical server, at the migration enable time (S17-12). After that, the management server 11 issues a command that indicates that the power of the physical server that is a migration source is turned off, to the physical server that is a migration source (S17-13). The physical server that is a migration source turns off the power when the physical server receives the command.

Next, output processing of a power consumption reduction amount after migration (S18) is described with reference to FIG. 24. The management server 11 calculates operational consumption power of the service by combining operational consumption power of all physical servers on which the systems used for the service are operated.

FIG. 24 illustrates an output example of a power consumption reduction amount after migration in the embodiment. The output content of the power consumption reduction amount after migration includes data items of "migration target service name", "migration target time zone", "migration source physical server name", "virtual server name", and "migration destination physical server". In addition, the output content includes data items of "operational consumption power (W) before migration", "operational consumption power (W) after migration", and "reduction power (W) (operational consumption power before migration-operational consumption power after migration)".

Here, "migration target service name" indicates the name of a service that is a migration target. In addition, "migration target time zone" indicates a time zone of a migration target. In addition, "migration source physical server name" indicates the name of a physical server that is a migration source of a virtual server that executes the service. In addition, "virtual server name" indicates the name of a virtual server that executes the service in the migration source physical server. In addition, "migration destination physical server name" indicates the name of physical server that is a migration destination of the virtual server. In addition, "operational consumption power (W) before migration" indicates operational consumption power (W) before migration of a virtual server of the service. In addition, "operational consumption power (W) after migration" indicates operational consumption power (W) after migration of the virtual server. In "reduction power (W) (operational consumption power before migration–operational consumption power after migration)", a value of "operational consumption power (W) before migration–operational consumption power (W) after migration" is stored.

In the embodiment, an operation of the information processing device having excellent energy efficiency such as reduction in the usage power of the information processing device can be realized while a service level of the business service is kept. In addition, the power of an air conditioner that is used to cool heat due to the information processing device can be reduced. In addition, a power consumption reduction amount that is reduced by migration can be checked.

Figure 25:
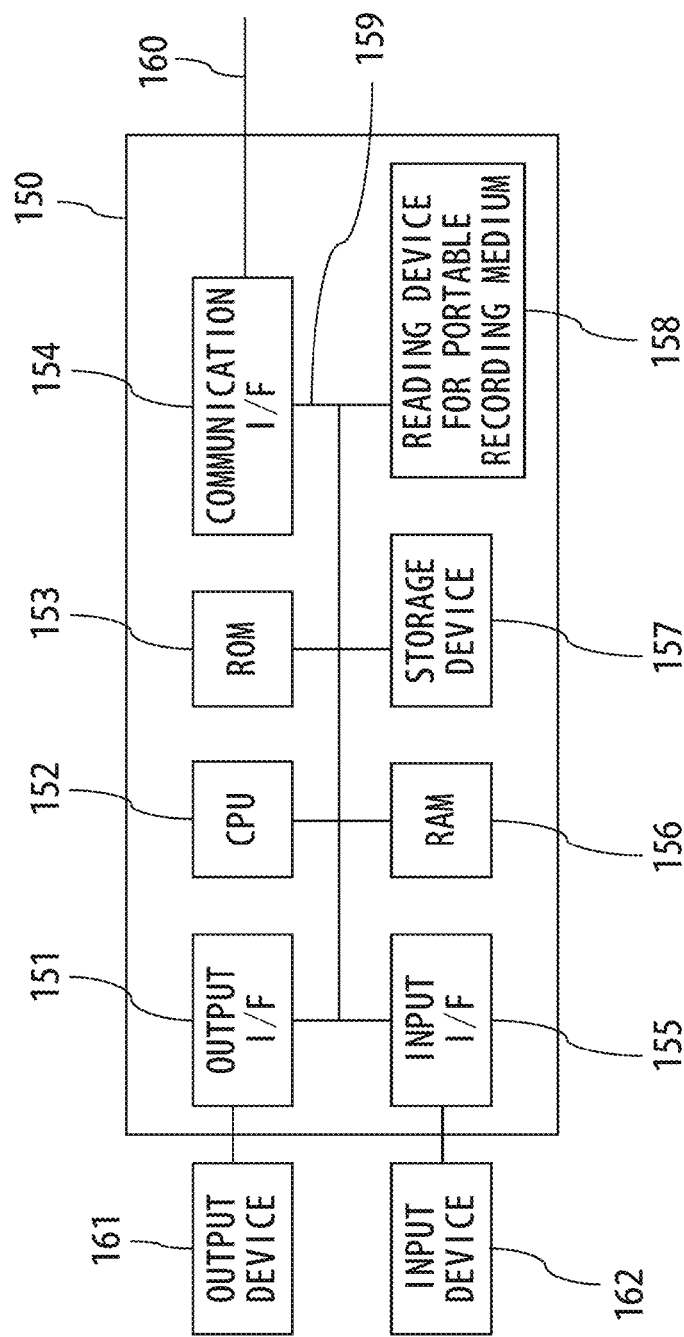
FIG. 25 is a configuration block diagram of a hardware environment of a computer to which the embodiment is applied.

FIG. 25 is a configuration block diagram illustrating a hardware environment of a computer to which the embodiment is applied. A computer 150 functions as the management server 11 by reading a program that executes the processing in the embodiment.

The computer 150 includes an output I/F 151, a CPU 152, a ROM 153, a communication I/F 154, an input I/F 155, a RAM 156, a storage device 157, a reading device 158, and a bus 159. The computer 150 can be connected to an output device 161, and an input device 162.

Here, the CPU indicates a central processing unit. The ROM indicates a read-only memory. The RAM indicates a random access memory. The I/F indicates an interface. To the bus 159, the output I/F 151, the CPU 152, the ROM 153, the communication I/F 154, the input I/F 155, the RAM 156, the storage device 157, and the reading device 158 are connected. The reading device 158 is a device that performs reading from a portable recording medium. The output device 161 is connected to the output I/F 151. The input device 162 is connected to the input I/F 155.

As the storage device 157, a storage device having various formats such as a hard disk drive device, a flush memory device, and a magnetic disk device can be used.

In the storage device 157 or the ROM 153, for example, the program that achieves the processing that is described in the embodiment is stored. In addition, in the storage device 157 or the ROM 153, the physical server management information 30, the virtual server management information 40, the service management information 50, the safety level table 55, and the operation information 56 of a virtual server are stored. In addition, in the storage device 157 or the ROM 153, the appearance rate information (Y00-1) analysis table 60, the appearance rate information (Y00-2) analysis table 70, the time zone candidate table 80, the migration availability server list 90, and the incident management table 100 are stored. In addition, in the storage device 157 or the ROM 153, the migration enable time period calendar 110, the server operation schedule calendar 120, and the migration/power-off candidate table 130 are stored.

The CPU 152 reads the program that achieves the processing that is described in the embodiment and is stored in the storage device 157, and executes the program. Specifically, the CPU 152 functions as the control unit 4 (the obtaining unit 21, the collection unit 22, the service identification unit 23, the candidate determination unit 24, the exception processing unit 25, the VM migration control unit 26, the power-off control unit 27, and the output unit 28) by executing the program.

The program that achieves the processing that is described in the embodiment may be stored for example, in the storage device 157 through a communication network 160 and the communication I/F 154 from the a program provider side. In addition, the program that achieves the processing that is described in the embodiment may be stored in a portable storage medium that is commercially available and put into circulation. In this case, the portable storage medium is installed in the reading device 158, and the program may be readout and executed by the CPU 152. As the portable storage medium, a storage medium having various formats such as a CD-ROM, a flexible disk, an optical disk, a magneto-optical disk, an integrated circuit (IC) card, and a universal serial bus (USB) memory device can be used. The program that is stored in such a storage medium is read by the reading device 158.

In addition, as the input device 162, a keyboard, a mouse, an electronic camera, a web camera, a microphone, a scanner, a sensor, a tablet, a touch panel, and the like can be used. In addition, as the output device 161, a display, a printer, a speaker, and the like can be used. In addition, as the communication network 160, the Internet, a LAN, a WAN, a dedicated line, a wired line, a wireless line, and the like may be used.

It is noted that the present invention can be not intended to be limited to the embodiments described above, and various configurations or embodiments can be employed without departing from the scope of the present invention.

According to an aspect of the present invention, a technology can be provided by which power consumption of the information processing system is reduced while a service level is taken into consideration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for controlling an information processing system, the apparatus comprising:
   a memory; and
   a control unit configured to perform a process including:
      obtaining response information that includes a result of processing executed by a plurality of virtual machines that operates on a first information processing device, in response to request information that is transmitted to the information processing system that includes a plurality of information processing devices, the first information processing device being included in the plurality of information processing devices;

calculating a first evaluation value that is used to evaluate a response time from transmission of the request information to reception of the response information;

calculating a value that depends on a ratio of a processing capability of the first information processing device to a processing capability of a second information processing device, the second information processing device being included in the plurality of information processing devices and reserving capacity for executing the processing;

calculating an occupation proportion of a processing time of each of the plurality of virtual machines in the response time, the processing time being a time taken by each of the plurality of virtual machines to execute the processing;

calculating, based on the first evaluation value, the value that depends on the ratio and the occupation proportion, a second evaluation value that is used to evaluate a processing time that occurs when the virtual machines operates on the second information processing device, the processing time being a period of time extending from transmission of the request information to reception of the response information;

determining the second information processing device to be a migration destination candidate of the virtual machines when the calculated second evaluation value is smaller than a first threshold value; and migrating the virtual machines that operates on the first information processing device to the migration destination candidate to turn off power of the first information processing device.

2. The apparatus according to claim 1, wherein
in the determining, the second information processing device is determined to be the migration destination candidate of the virtual machines when a value of a usage rate of a resource of the second information processing device is smaller than a second threshold value.

3. The apparatus according to claim 1, wherein
in the migrating of the virtual machines in the migration destination candidate, when a plurality of virtual machines operate on the first information processing device, and the response information is processed by all or a part of the plurality of the virtual machines, the migration destination candidate is determined for each of the plurality of information processing devices, and all or a part of the virtual machines that have processed the response information is migrated to the migration destination candidate when the first information processing device is not determined to be the migration destination candidate.

4. The apparatus according to claim 1, wherein
in the migrating of the virtual machines in the migration destination candidate, mean time between failures is calculated using failure history information of the second information processing device, a most recent failure occurrence day is obtained from the failure history information, a next failure occurrence predicted day is calculated from the failure occurrence day and the mean time between failures, the virtual machine that operates on the first information processing device is migrated to the migration destination candidate in a day within a period from the most recent failure occurrence day to the next failure occurrence predicted day, and power of the first information processing device is turned off.

5. The apparatus according to claim 1, the process further including:
calculating an evaluation value that is used to evaluate processing performance from transmission of the request information to reception of the response information, calculating an appearance rate of the evaluation value for each of the evaluation values in a first unit of time, and identifying a first time zone in which the appearance rate exceeds a threshold value in any of the evaluation values.

6. The apparatus according to claim 5, wherein
in the identifying of the first time zone, an appearance rate of the evaluation value is calculated in a second unit of time, which is a lower-level of the first unit of time for each of the evaluation values, and a second time zone in which the appearance rate exceeds a threshold value in any of the evaluation values identified out of consecutive time zones in the second unit of time.

7. The apparatus according to claim 6, wherein
in the identifying of the first time zone, the identified first time zone is excluded when a certain day or a time zone is included in the identified first time zone, and the identified second time zone is excluded when a length of the identified second time zone is shorter than a threshold value.

8. A non-transitory computer-readable recording medium having stored therein a program for causing a computer to execute process for controlling an information processing system, the process comprising:

obtaining response information that include a result of processing executed by a plurality of virtual machines that operates on a first information processing device, in response to request information that is transmitted to the information processing system that includes a plurality of information processing devices, the first information processing device being included in the plurality of information processing devices;

calculating a first evaluation value that is used to evaluate a response time from transmission of the request information to reception of the response information, calculating a value that depends on a ratio of a processing capability of the first information processing device to a processing capability of a second information processing device, the second information processing device being included in the plurality of information processing devices and reserving capacity for executing the processing;

calculating an occupation proportion of a processing time of each of the plurality of virtual machines in the response time, the processing time being a time taken by each of the plurality of virtual machines to execute the processing;

calculating, based on the first evaluation value, the value that depends on the ratio and the occupation proportion, a second evaluation value that is used to evaluate a response time that occurs when the virtual machines operates on the second information processing device, the processing time being a period of time extending from transmission of the request information to reception of the response information, determining the second information processing device to be a migration destination candidate of the virtual machines when the calculated second evaluation value is smaller than a first threshold value; and migrating the virtual machines that operates on the first information processing device to the migration destination candidate to turn off power of the first information processing device.

9. The non-transitory computer-readable recording medium according to claim 8, wherein
in the determining, the second information processing device is determined to be the migration destination candidate of the virtual machines when a value of a usage rate of a resource of the second information processing device is smaller than a second threshold value.

10. The non-transitory computer-readable recording medium according to claim 8, wherein
in the migrating of the virtual machines in the migration destination candidate, when a plurality of virtual machines operate on the first information processing device, and the response information is processed by all or a part of the plurality of the virtual machines, the migration destination candidate is determined for each of the plurality of information processing devices, and all or a part of the virtual machines that have processed the response information are migrated to the migration destination candidate when the first information processing device is not determined to be the migration destination candidate.

11. The non-transitory computer-readable recording medium according to claim 8, wherein
in the migrating of the virtual machines in the migration destination candidate, mean time between failures is calculated using failure history information of the second information processing device, a most recent failure occurrence day is obtained from the failure history information, a next failure occurrence predicted day are calculated from the failure occurrence day and the mean time between failures, the virtual machine that operates on the first information processing device is migrated to the migration destination candidate in a day within a period from the most recent failure occurrence day to the next failure occurrence predicted day, and power of the first information processing device is turned off.

12. The non-transitory computer-readable recording medium according to claim 8, the processing further including:
calculating an evaluation value that is used to evaluate processing performance from transmission of the request information to reception of the response information, calculating an appearance rate of the evaluation value for each of the evaluation values in a first unit of time, and identifying a first time zone in which the appearance rate exceeds a threshold value in any of the evaluation values.

13. The non-transitory computer-readable recording medium according to claim 12, wherein
in the identifying of the first time zone, an appearance rate of the evaluation value is calculated in a second unit of time, which is a lower-level of the first unit of time for each of the evaluation values, and a second time zone in which the appearance rate exceeds a threshold value in any of the evaluation values is identified out of consecutive time zones in the second unit of time.

14. The non-transitory computer-readable recording medium according to claim 12, wherein
in the identifying of the first time zone, further, the identified first time zone is excluded when a certain day or time zone is included in the identified first time zone, and the identified second time zone is excluded when a length of the identified second time zone is shorter than a threshold value.

15. A method for controlling an information processing system, the method comprising:
obtaining, by using a computer, response information that include a result of processing executed by a plurality of virtual machine machines that operates on a first information processing device, in response to request information that is transmitted to the information processing system that includes a plurality of information processing devices, the first information processing device being included in the plurality of information processing devices;
calculating, by using the computer, a first evaluation value that is used to evaluate a response time from transmission of the request information to reception of the response information;
calculating, by using the computer, a value that depends on a ratio of a processing capability of the first information processing device to a processing capability of a second information processing device, the second information processing device being included in the plurality of information processing devices and reserving capacity for executing the processing;
calculating, by using the computer, an occupation proportion of a processing time of each of the plurality of virtual machines in the response time, the processing time being a time taken by each of the plurality of virtual machines to execute the processing;
calculating, by using the computer, a second evaluation value that is used to evaluate a response time that occurs when the virtual machines operates on the second information processing device, the processing time being a period of time extending from transmission of the request information to reception of the response information based on the first evaluation value, the value that depends on the ratio and the occupation proportion;
determining, by using the computer, the second information processing device to be a migration destination candidate of the virtual machines when the calculated second evaluation value is smaller than a first threshold value; and
migrating, by using the computer, the virtual machines that operates on the first information processing device to the migration destination candidate to turn off power of the first information processing device.

* * * * *